(12) United States Patent
Mirjalili et al.

(10) Patent No.: US 10,838,232 B2
(45) Date of Patent: Nov. 17, 2020

(54) EYE-MOUNTED DISPLAYS INCLUDING EMBEDDED SOLENOIDS

(71) Applicant: Spy Eye, LLC, Palo Alto, CA (US)

(72) Inventors: Ramin Mirjalili, San Jose, CA (US); Thomas Llewellyn Owens, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 16/200,039

(22) Filed: Nov. 26, 2018

(65) Prior Publication Data

US 2020/0166776 A1    May 28, 2020

(51) Int. Cl.
| | |
|---|---|
| *G02C 7/04* | (2006.01) |
| *G02C 11/00* | (2006.01) |
| *G02B 13/16* | (2006.01) |
| *H02J 50/10* | (2016.01) |
| *G02B 27/01* | (2006.01) |

(52) U.S. Cl.
CPC .............. *G02C 7/04* (2013.01); *G02B 13/16* (2013.01); *G02B 27/0172* (2013.01); *G02C 11/10* (2013.01); *H02J 50/10* (2016.02)

(58) Field of Classification Search
CPC ...... G02C 7/04; G02C 11/10; G02B 27/0172; G02B 13/16; H02J 50/10
See application file for complete search history.

(56) References Cited

U.S. PATENT DOCUMENTS

| | | | |
|---|---|---|---|
| 4,014,321 | A | 3/1977 | March |
| 4,577,545 | A | 3/1986 | Kemeny |
| 4,871,247 | A | 10/1989 | Haynes |

(Continued)

FOREIGN PATENT DOCUMENTS

| | | |
|---|---|---|
| CA | 2280022 | 1/2001 |
| CA | 2280022 A1 | 1/2001 |

(Continued)

OTHER PUBLICATIONS

Chronos Vision GmbH, "Scleral Search Coils 2D/3D," 4 pages, [Online][Retrieved Feb. 28, 2019], Retrieved from the internet <http://www.chronos-vision.de/downloads/CV Product SSC.pdf>. (4 pages).

(Continued)

*Primary Examiner* — Benyam Ketema
(74) *Attorney, Agent, or Firm* — Fenwick & West LLP

(57) ABSTRACT

An augmented reality system may include an electronic contact lens and a power source. In order to enable the wireless transfer of power and data between the contact lens and the power source, one or both of the contact lens and the power source may contain solenoids. When current is driven through an embedded solenoid of the power source, the solenoid can produce a time-varying magnetic field. Likewise, when an embedded solenoid of the contact lens is in the presence of a time-varying magnetic field, a current is induced within the solenoid that may be used to power electronic components within the contact lens. Multiple solenoids may be embedded within the power source or the contact lens at positions and orientations that enable the contact lens to wirelessly receive power from a magnetic field produced by the power source at a variety of orientations.

17 Claims, 18 Drawing Sheets

(56) References Cited

U.S. PATENT DOCUMENTS

| | | |
|---|---|---|
| 4,941,068 A | 7/1990 | Hofmann |
| 5,331,149 A | 7/1994 | Spitzer |
| 5,467,104 A | 11/1995 | Furness, III |
| 5,638,218 A | 6/1997 | Oomura |
| 5,638,219 A | 6/1997 | Medina Puerta |
| 5,682,210 A * | 10/1997 | Weirich ............. G02B 27/017 345/32 |
| 5,699,193 A | 12/1997 | Monno |
| 5,712,721 A | 1/1998 | Large |
| 5,726,916 A | 3/1998 | Smyth |
| 6,120,460 A * | 9/2000 | Abreu ............. A61B 3/1241 600/405 |
| 6,181,287 B1 | 1/2001 | Beigel |
| 6,215,593 B1 | 4/2001 | Bruce |
| 6,307,945 B1 | 10/2001 | Hall |
| 6,312,393 B1 | 11/2001 | Abreu |
| 6,509,743 B1 | 1/2003 | Ferrero |
| 6,570,386 B2 | 5/2003 | Goldstein |
| 6,594,370 B1 | 7/2003 | Anderson |
| 6,823,171 B1 | 11/2004 | Kaario |
| 6,851,805 B2 | 2/2005 | Blum |
| 6,920,283 B2 | 7/2005 | Goldstein |
| 7,088,235 B1 | 8/2006 | Carricut |
| 7,137,952 B2 | 11/2006 | Leonardi |
| 7,359,059 B2 | 4/2008 | Lust |
| 7,562,445 B2 | 7/2009 | Lerch |
| 7,626,562 B2 | 12/2009 | Iwasaki |
| 7,758,187 B2 | 7/2010 | Amirparviz |
| 7,835,056 B2 | 11/2010 | Doucet |
| 7,893,832 B2 | 2/2011 | Laackmann |
| 7,931,832 B2 * | 4/2011 | Pugh ............. B29D 11/00826 264/1.32 |
| 8,077,245 B2 | 12/2011 | Adamo |
| 8,087,777 B2 | 1/2012 | Rosenthal |
| 8,096,654 B2 | 1/2012 | Amirparviz |
| 8,215,770 B2 * | 7/2012 | Blum ............. G02C 7/04 351/159.03 |
| 8,348,422 B2 | 1/2013 | Pugh |
| 8,348,424 B2 | 1/2013 | Pugh |
| 8,394,660 B2 | 3/2013 | Kim |
| 8,398,239 B2 | 3/2013 | Horning |
| 8,430,310 B1 | 4/2013 | Ho |
| 8,441,731 B2 | 5/2013 | Sprague |
| 8,446,341 B2 | 5/2013 | Amirparviz |
| 8,482,858 B2 | 7/2013 | Sprague |
| 8,520,309 B2 | 8/2013 | Sprague |
| 8,526,879 B2 | 9/2013 | Kristiansen |
| 8,579,434 B2 | 11/2013 | Amirparviz |
| 8,582,209 B1 | 11/2013 | Amirparviz |
| 8,608,310 B2 | 12/2013 | Otis |
| 8,632,182 B2 | 1/2014 | Chen |
| 8,721,074 B2 | 5/2014 | Pugh |
| 8,764,185 B1 * | 7/2014 | Biederman ............. G02C 7/04 351/159.02 |
| 8,781,570 B2 | 7/2014 | Chuang |
| 8,786,520 B2 | 7/2014 | Legerton |
| 8,786,675 B2 | 7/2014 | Deering |
| 8,798,332 B2 | 8/2014 | Otis |
| 8,827,445 B1 | 9/2014 | Wiser |
| 8,830,571 B1 | 9/2014 | Vizgaitis |
| 8,870,370 B1 | 10/2014 | Otis |
| 8,874,182 B2 | 10/2014 | Etzkorn |
| 8,906,088 B2 | 12/2014 | Pugh |
| 8,911,078 B2 | 12/2014 | Meyers |
| 8,922,898 B2 | 12/2014 | Legerton |
| 8,926,809 B2 * | 1/2015 | Pletcher ............. A61B 5/1495 204/403.14 |
| 8,931,906 B2 | 1/2015 | Huang |
| 8,960,898 B1 | 2/2015 | Etzkorn |
| 8,963,268 B2 | 2/2015 | Kim |
| 8,964,298 B2 | 2/2015 | Haddick |
| 8,971,978 B2 | 3/2015 | Ho |
| 8,985,763 B1 | 3/2015 | Etzkorn |
| 8,989,834 B2 | 3/2015 | Ho |
| 9,000,000 B2 | 4/2015 | Carroll |
| 9,028,068 B2 | 5/2015 | Chang |
| 9,028,772 B2 * | 5/2015 | Yao ............. B29D 11/00826 422/425 |
| 9,039,171 B2 | 5/2015 | Groisman |
| 9,040,923 B2 | 5/2015 | Sprague |
| 9,047,512 B2 | 6/2015 | Otis |
| 9,048,389 B2 | 6/2015 | Fu |
| 9,052,528 B2 | 6/2015 | Pugh |
| 9,052,533 B2 | 6/2015 | Pugh |
| 9,054,079 B2 | 6/2015 | Etzkorn |
| 9,058,053 B2 | 6/2015 | Covington |
| 9,063,351 B1 | 6/2015 | Ho |
| 9,063,352 B2 | 6/2015 | Ford |
| 9,111,473 B1 | 8/2015 | Ho |
| 9,130,099 B2 | 9/2015 | Robin |
| 9,130,122 B2 | 9/2015 | Fu |
| 9,134,546 B2 | 9/2015 | Pugh |
| 9,153,074 B2 | 10/2015 | Zhou |
| 9,158,133 B1 | 10/2015 | Pletcher |
| 9,161,712 B2 | 10/2015 | Etzkorn |
| 9,170,646 B2 | 10/2015 | Toner |
| 9,178,107 B2 | 11/2015 | Tsai |
| 9,192,298 B2 | 11/2015 | Bouwstra |
| 9,195,075 B2 | 11/2015 | Pugh |
| 9,196,094 B2 | 11/2015 | Ur |
| 9,215,293 B2 | 12/2015 | Miller |
| 9,217,881 B2 | 12/2015 | Pugh |
| 9,225,375 B2 * | 12/2015 | Pugh ............. H04B 1/385 |
| 9,244,285 B2 | 1/2016 | Chen |
| 9,271,677 B2 | 3/2016 | Leonardi |
| 9,282,920 B2 | 3/2016 | Ho |
| 9,289,123 B2 | 3/2016 | Weibel |
| 9,289,954 B2 | 3/2016 | Linhardt |
| 9,298,002 B2 | 3/2016 | Border |
| 9,298,020 B1 | 3/2016 | Etzkorn |
| D754,861 S | 4/2016 | Etzkorn |
| 9,307,905 B2 | 4/2016 | Varel |
| 9,310,626 B2 | 4/2016 | Pugh |
| 9,316,848 B2 | 4/2016 | Pugh |
| 9,326,710 B1 | 5/2016 | Liu |
| 9,332,935 B2 * | 5/2016 | Etzkorn ............. A61B 5/682 |
| 9,335,562 B2 | 5/2016 | Pugh |
| 9,341,843 B2 | 5/2016 | Border |
| 9,366,872 B2 | 6/2016 | Honea |
| 9,366,881 B2 | 6/2016 | Pugh |
| 9,389,433 B2 | 7/2016 | Pugh |
| 9,401,454 B2 | 7/2016 | Robin |
| 9,414,746 B2 | 8/2016 | Bergman |
| 9,425,359 B2 | 8/2016 | Tsai |
| 9,442,307 B2 | 9/2016 | Meyers |
| 9,442,310 B2 | 9/2016 | Biederman |
| 9,445,768 B2 | 9/2016 | Alexander |
| 9,523,865 B2 | 12/2016 | Pletcher |
| 9,629,774 B2 | 4/2017 | Dayal |
| 9,728,981 B2 | 8/2017 | Lee |
| 9,810,926 B2 * | 11/2017 | Sako ............. G02C 11/10 |
| 9,939,658 B1 | 4/2018 | Gutierrez |
| 10,025,118 B1 * | 7/2018 | Markus ............. G02C 7/04 |
| 1,027,864 A1 | 5/2019 | Etzkorn |
| 10,644,543 B1 * | 5/2020 | Pang ............. H02J 50/40 |
| 2002/0067232 A1 * | 6/2002 | Oshima ............. H01F 41/005 336/96 |
| 2002/0084904 A1 | 7/2002 | De La Huerga |
| 2002/0101383 A1 | 8/2002 | Junod |
| 2003/0173408 A1 | 9/2003 | Mosher |
| 2003/0179094 A1 | 9/2003 | Abreu |
| 2004/0027536 A1 * | 2/2004 | Blum ............. B29D 11/00826 351/159.03 |
| 2005/0179604 A1 | 8/2005 | Liu |
| 2006/0177086 A1 | 8/2006 | Rye |
| 2006/0290882 A1 | 12/2006 | Meyers |
| 2007/0024423 A1 | 2/2007 | Nikitin |
| 2007/0241986 A1 | 10/2007 | Lee |
| 2008/0165072 A1 * | 7/2008 | Schlager ............. H01Q 1/2291 343/788 |
| 2009/0058189 A1 | 3/2009 | Cook |
| 2009/0066722 A1 | 3/2009 | Kriger |
| 2009/0072628 A1 | 3/2009 | Cook |

(56) References Cited

U.S. PATENT DOCUMENTS

| | | | |
|---|---|---|---|
| 2009/0244477 A1* | 10/2009 | Pugh | B29D 11/00038 351/158 |
| 2010/0001926 A1 | 1/2010 | Amirparviz | |
| 2010/0110372 A1* | 5/2010 | Pugh | B29D 11/00826 351/159.75 |
| 2010/0113901 A1* | 5/2010 | Zhang | A61B 5/1455 600/319 |
| 2010/0136905 A1 | 6/2010 | Kristiansen | |
| 2010/0234717 A1 | 9/2010 | Wismer | |
| 2010/0253476 A1 | 10/2010 | Poutiatine | |
| 2010/0308749 A1 | 12/2010 | Liu | |
| 2011/0034134 A1 | 2/2011 | Henderson | |
| 2011/0046475 A1* | 2/2011 | Assif | G01R 33/24 600/422 |
| 2011/0221659 A1 | 9/2011 | King, III | |
| 2012/0092612 A1* | 4/2012 | Binder | G02C 7/081 351/159.02 |
| 2012/0105226 A1 | 5/2012 | Bourdeau | |
| 2012/0262003 A1 | 10/2012 | Tetu | |
| 2013/0050432 A1 | 2/2013 | Perez | |
| 2013/0100139 A1 | 4/2013 | Schliesser | |
| 2013/0242077 A1 | 9/2013 | Lin | |
| 2013/0270664 A1 | 10/2013 | Kim | |
| 2014/0016097 A1 | 1/2014 | Leonardi | |
| 2014/0063054 A1 | 3/2014 | Osterhout | |
| 2014/0081178 A1* | 3/2014 | Pletcher | G02C 7/04 600/595 |
| 2014/0098226 A1 | 4/2014 | Pletcher | |
| 2014/0120983 A1 | 5/2014 | Lam | |
| 2014/0192311 A1 | 7/2014 | Pletcher | |
| 2014/0198128 A1 | 7/2014 | Hong | |
| 2014/0240665 A1 | 8/2014 | Pugh | |
| 2014/0252868 A1 | 9/2014 | Yamada | |
| 2014/0292620 A1 | 10/2014 | Lapstun | |
| 2014/0371560 A1 | 12/2014 | Etzkorn | |
| 2015/0005604 A1 | 1/2015 | Biederman | |
| 2015/0016777 A1 | 1/2015 | Abovitz | |
| 2015/0060904 A1 | 3/2015 | Robin | |
| 2015/0062533 A1 | 3/2015 | Toner | |
| 2015/0072615 A1 | 3/2015 | Mofidi | |
| 2015/0088253 A1 | 3/2015 | Doll | |
| 2015/0123785 A1 | 5/2015 | Haflinger | |
| 2015/0126845 A1 | 5/2015 | Jin | |
| 2015/0145095 A1 | 5/2015 | Kim | |
| 2015/0147975 A1 | 5/2015 | Li | |
| 2015/0148628 A1 | 5/2015 | Abreu | |
| 2015/0150510 A1 | 6/2015 | Leonardi | |
| 2015/0171274 A1 | 6/2015 | Guo | |
| 2015/0173602 A1 | 6/2015 | Barrows | |
| 2015/0223684 A1 | 8/2015 | Hinton | |
| 2015/0227735 A1 | 8/2015 | Chappell | |
| 2015/0234205 A1 | 8/2015 | Schowengerdt | |
| 2015/0235439 A1 | 8/2015 | Schowengerdt | |
| 2015/0235440 A1 | 8/2015 | Schowengerdt | |
| 2015/0235444 A1 | 8/2015 | Schowengerdt | |
| 2015/0235446 A1 | 8/2015 | Schowengerdt | |
| 2015/0235457 A1 | 8/2015 | Schowengerdt | |
| 2015/0235468 A1 | 8/2015 | Schowengerdt | |
| 2015/0235471 A1 | 8/2015 | Schowengerdt | |
| 2015/0241698 A1 | 8/2015 | Schowengerdt | |
| 2015/0243090 A1 | 8/2015 | Schowengerdt | |
| 2015/0261294 A1 | 9/2015 | Urbach | |
| 2015/0281411 A1 | 10/2015 | Markus | |
| 2015/0301338 A1 | 10/2015 | Van Heugten | |
| 2015/0305929 A1* | 10/2015 | Goldberg | G02B 1/043 604/521 |
| 2015/0339857 A1 | 11/2015 | O'Connor | |
| 2015/0362750 A1 | 12/2015 | Yeager | |
| 2015/0362752 A1 | 12/2015 | Linhardt | |
| 2015/0372395 A1 | 12/2015 | Lavedas | |
| 2015/0380461 A1 | 12/2015 | Robin | |
| 2015/0380988 A1 | 12/2015 | Chappell | |
| 2016/0006115 A1 | 1/2016 | Etzkorn | |
| 2016/0011419 A1 | 1/2016 | Gao | |
| 2016/0018650 A1 | 1/2016 | Haddick | |
| 2016/0018651 A1 | 1/2016 | Haddick | |
| 2016/0018652 A1 | 1/2016 | Haddick | |
| 2016/0018653 A1 | 1/2016 | Haddick | |
| 2016/0030160 A1 | 2/2016 | Markus | |
| 2016/0049544 A1 | 2/2016 | Robin | |
| 2016/0066825 A1 | 3/2016 | Barrows | |
| 2016/0080855 A1 | 3/2016 | Greenberg | |
| 2016/0091737 A1 | 3/2016 | Kim | |
| 2016/0093666 A1 | 3/2016 | Gilet | |
| 2016/0097940 A1 | 4/2016 | Sako | |
| 2016/0113760 A1 | 4/2016 | Conrad | |
| 2016/0141449 A1 | 5/2016 | Robin | |
| 2016/0141469 A1 | 5/2016 | Robin | |
| 2016/0143728 A1 | 5/2016 | De Smet | |
| 2016/0147301 A1 | 5/2016 | Iwasaki | |
| 2016/0154256 A1 | 6/2016 | Yajima | |
| 2016/0172536 A1 | 6/2016 | Tsai | |
| 2016/0172869 A1 | 6/2016 | Park | |
| 2016/0204307 A1 | 7/2016 | Robin | |
| 2016/0223842 A1 | 8/2016 | Yun | |
| 2016/0253831 A1 | 9/2016 | Schwarz | |
| 2016/0261142 A1 | 9/2016 | Park | |
| 2016/0270176 A1 | 9/2016 | Robin | |
| 2016/0270187 A1 | 9/2016 | Robin | |
| 2016/0276328 A1 | 9/2016 | Robin | |
| 2016/0299354 A1 | 10/2016 | Shtukater | |
| 2017/0023793 A1 | 1/2017 | Shtukater | |
| 2017/0042480 A1 | 2/2017 | Gandhi | |
| 2017/0168322 A1 | 6/2017 | Toner | |
| 2017/0188848 A1 | 7/2017 | Banet | |
| 2017/0189699 A1 | 7/2017 | Dellamano | |
| 2017/0231337 A1 | 8/2017 | Anderson | |
| 2017/0234818 A1 | 8/2017 | Jesme | |
| 2017/0255026 A1* | 9/2017 | Rakhyani | A61B 3/113 |
| 2017/0270636 A1 | 9/2017 | Shtukater | |
| 2017/0337461 A1 | 11/2017 | Jesme | |
| 2017/0371184 A1 | 12/2017 | Shtukater | |
| 2018/0036974 A1 | 2/2018 | Hahn | |
| 2018/0212313 A1 | 7/2018 | Harper | |
| 2019/0074823 A1 | 3/2019 | Der | |

FOREIGN PATENT DOCUMENTS

| | | | |
|---|---|---|---|
| CN | 20341095 | * | 9/2015 |
| WO | 2016014118 A1 | | 1/2016 |
| WO | 2016022665 A1 | | 2/2016 |
| WO | 2016150630 A1 | | 9/2016 |
| WO | 2016195201 A1 | | 12/2016 |
| WO | WO2019069555 | * | 7/2018 |

OTHER PUBLICATIONS

Kenyon, R.V., "A soft Contact Lens Search Coil for Measuring Eye Movements," Vision Research, vol. 25, No. 11, pp. 1629-1633, 1985.

Lupu, R.G. et al., "A Survey of Eye Tracking Methods and Applications," Gheorghe Asachi Technical University of Iasi, Aug. 29, 2013, pp. 71-86.

Umraiya, A, "Design of Miniaturized Coil System Using Mems Technology for Eye Movement Measurement," McGill University, Montreal, Aug. 2009, pp. i-69.

Paperno et al., A New Method for Magnetic Position and Orientation Tracking, IEEE Transactions on Magnetics, vol. 37, No. 4, Jul. 2001, pp. 1938-1940.

Kao, H-L. et al., "DuoSkin: Rapidly Prototyping On-Skin User Interfaces Using Skin-Friendly Materials," ISWC '16, ACM, Sep. 12-16, 2016, 8 pages.

Avestruz, A-T. et al., "Single-Sided AC Magnetic Fields for Induction Heating," 39th Annual Conference of the IEEE, Nov. 10-13, 2013, pp. 5052-5057.

* cited by examiner

EYE-MOUNTED DISPLAYS INCLUDING EMBEDDED SOLENOIDS

BACKGROUND

1. Technical Field

This disclosure relates generally to eye-mounted displays and, more particularly, to solenoids embedded in eye mounted displays.

2. Description of Related Art

Augmented reality (AR) adds computer-generated information to a person's view of the world around them. One type of AR system includes an electronic contact lens, for instance using tiny video projectors (or "femtoprojectors") as described in Deering (U.S. Pat. No. 8,786,675). Generally, electronic contact lenses cannot accommodate batteries of sufficient capacity to power the electronic contact lenses for very long. Accordingly, providing power to the electronic contact lenses wirelessly is an attractive alternative.

Figure 1:
FIG. 1 is an illustration of user wearing an augmented reality system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Introduction

An augmented reality (AR) system may include an electronic contact lens that contains small projectors, sometimes referred to as femtoprojectors. The femtoprojectors project images onto the user's retina. These are combined with images formed by external light passing through the electronic contact lens from the user's environment. This enables a user to view artificial images from the femtoprojectors overlaid on actual images of the real world.

The AR system includes a power source (such as a wearable necklace) that generates a time-varying magnetic field. The electronic contact lens contains a solenoid that produces a current when in the presence of the time-varying magnetic field. The electronic contact lens uses the induced current to produce power for the electronic contact lens. In alternate embodiments, the solenoid may be used to determine the orientation of the contact lens and/or to communicate data from/to the power source and/or an information processing device.

The magnitude of the current generated by the solenoid embedded in the contact lens is based, in part, on the configuration of the solenoid. For example, the number of turns of the solenoid, the cross-sectional area of the solenoid, the length of the solenoid, and the aspect ratio of the solenoid can all affect the amount of current generated by the solenoid. Additionally, an embedded solenoid may include a core of higher permeability material, such as a ferrite material or an iron alloy, to increase the amount of current produced by the solenoid relative to the same solenoid without the core.

The orientation of a solenoid embedded within the electronic contact lens relative to the direction of the time-varying magnetic field also affects the amount of current produced by the solenoid. As a wearer of an electronic contact lens looks around her environment, her head and eyes move such that the orientation of the embedded coils changes relative to the direction of the time-varying magnetic field. Consequently, the magnitude of current generated by an embedded solenoid changes based on the user's head and eye movement.

As a result, an electronic contact lens may include multiple embedded solenoids that are oriented along different directions. For example, each solenoid may be defined by an axis, with none of the axes parallel to each other. The range of orientations over which a set of solenoids may produce sufficient power in the presence of a time-varying magnetic field is greater if the solenoid axes are not parallel to each other.

The number of embedded solenoids and the positions and orientations of the embedded solenoids within the electronic contact lens may vary. For example, in various contact lenses, one or more embedded solenoids may have axes that extend primarily along a radial direction, or primarily along a polar angular coordinate relative to the lens. Various examples of embedded solenoids within a contact lens are described below.

The power source may include conductive coils (including other solenoids) to generate the time-varying magnetic field. The number of embedded solenoids and the positions and orientations of the embedded solenoids within the power source may vary.

Electronic Contact Lens Architecture

Turning now to the figures, FIG. 1 is an illustration of user wearing an augmented reality system. The augmented reality system 100 includes a wireless power source and an electronic contact lens 120 ("contact lens") with an image source, such as one or more femtoprojectors. In addition to providing power to the contact lens 120, the power source may transmit data to and receive data from the contact lens 120. In the illustrated example, the power source is a necklace 110. The contact lens 120 projects images onto the retina of the wearer to create an augmented reality, such as images wirelessly received from the necklace 110. Additionally, the contact lens 120 may provide motion and orientation information to the necklace 110.

The AR system of FIG. 1 may feel natural to the wearer because the contact lenses 120 and the necklace 110 are similar to normal contacts lenses and necklaces used in everyday life. For example, the contact lenses 120 may also function as regular contact lenses that provide refractive eyesight correction and the necklace 110 may be designed to look like ordinary jewelry. The necklace 110 may include additional hardware elements within its band 130 that can provide added functionality to the AR system. For example, the necklace 110 can communicatively couple to a smartphone, receive image data or other information from an application running on the smartphone, and provide power generation data to the application for display by the smartphone. The necklace 110 may also replace the smartphone rather than merely communicate with it.

As illustrated in FIG. 1, the power source is a necklace 110 that generates a time-varying magnetic field ("TVMF") and can inductively couple to the contact lens 120. In other embodiments the power source may be another type of device. For example, in some cases, the power source may be integrated into another type of wearable device such as a necktie, a scarf, a belt, the brim of a hat, the collar of a shirt, the hood of a jacket, the sleeve of a sweater, the front of a t-shirt, etc. In other examples, the power source may be an external device or structure. As an example, the power source may be a smart phone, a table-top box, or a power source coupled to the walls of an office.

Figure 2:
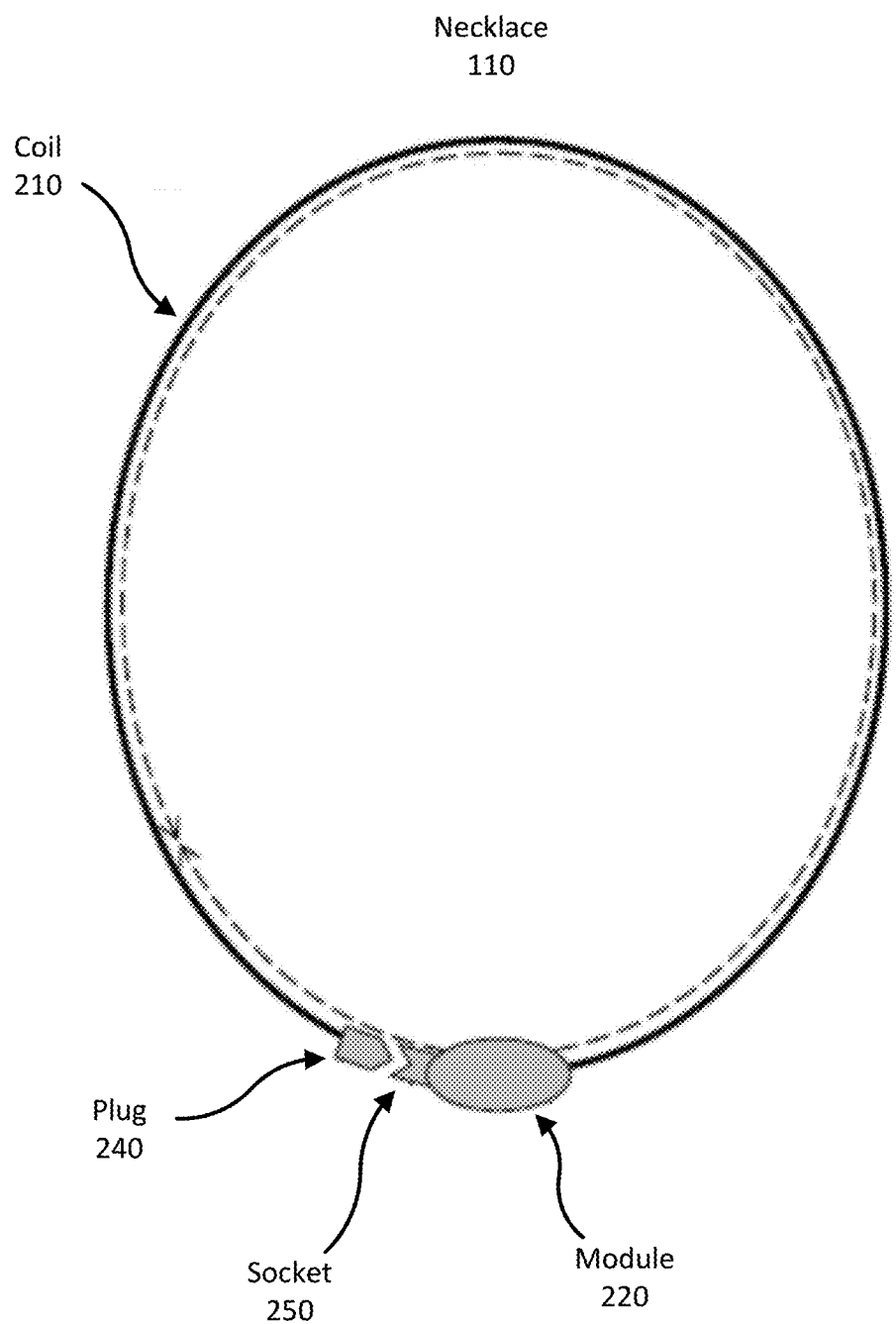
FIG. 2 is an illustration of a necklace of an augmented reality system.

FIG. 2 is an illustration of a necklace 110 of an augmented reality system 100. In the illustrated embodiment, the necklace 110 includes an electronic module 220 and a coil 210 of conductive material. The coil can be connected or disconnected with a plug 240 and a socket 250, or may be a single band without the plug and socket.

The necklace 110 includes various hardware elements, for instance within the electronic module 220, that enable functionality of the AR system 100. For example, the necklace 110 may include hardware elements that generate a TVMF for transferring power to the contact lens 120. Additionally, the hardware elements may include one or more of: a power source such as a battery; a modulator to drive a radio-frequency current in the necklace coil that may be used to inductively couple to and communicate with the contact lens 120; a high frequency data radio and/or high frequency data antenna configured to transmit and/or receive information; a data modem to encode data on the radio-frequency signal; sensors such as microphones, cameras, inertial sensors, and global navigational satellite system receivers; a cellular radio; a Wi-Fi radio; a Bluetooth radio; a graphics processing unit; and a microprocessor and memory. In various configurations, the hardware elements may be included in module 220 and/or may be distributed about the band 130. Alternatively, when the AR system 100 is connected to an external device or structure, any of the sensors, processors and other components mentioned above may be located in the device or structure.

Figure 3:
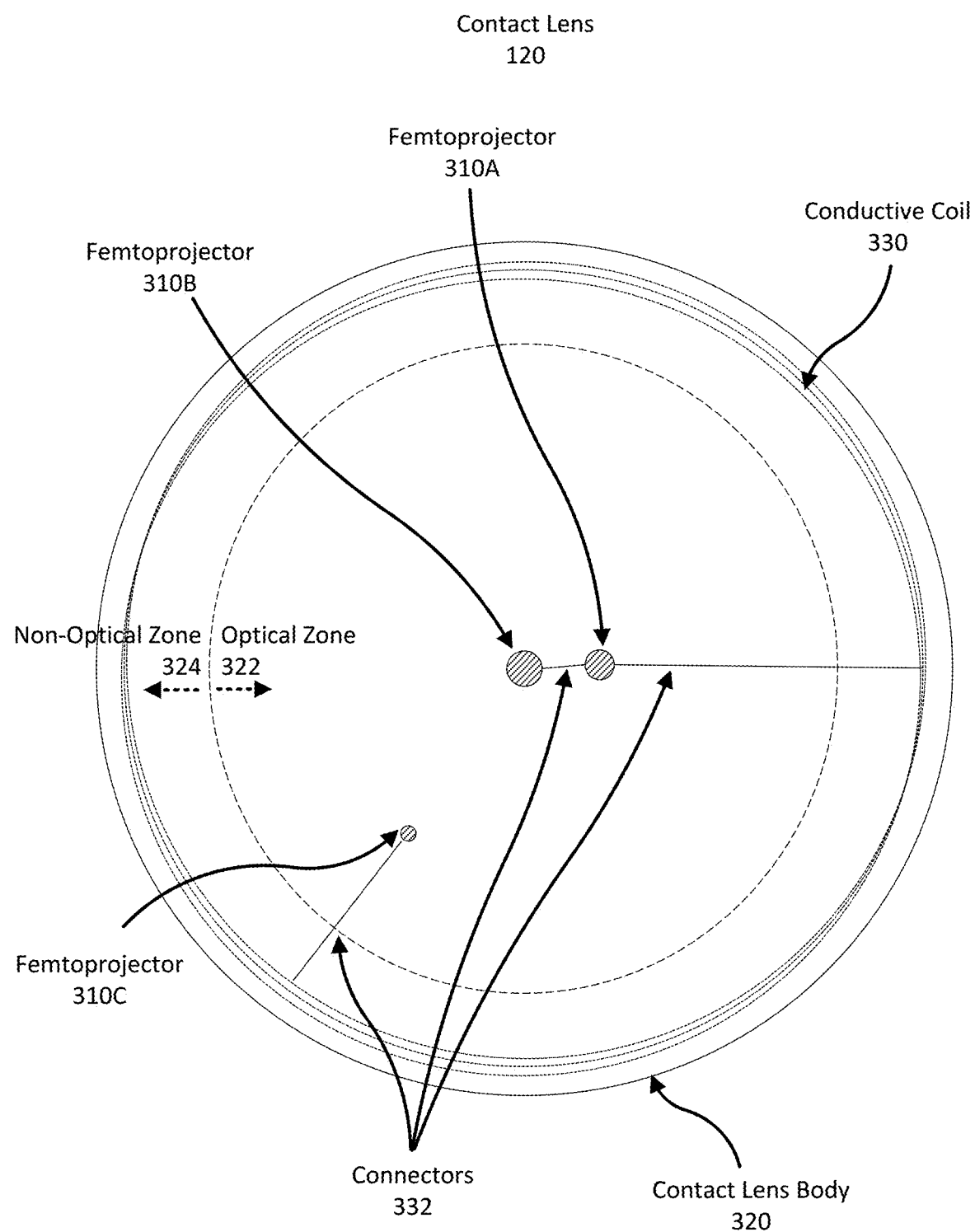
FIG. 3 is a plan view of an electronic contact lens.

FIG. 3 shows a plan view of a contact lens 120 with multiple femtoprojectors 310A-310C. More specifically, FIG. 3 shows three femtoprojectors 310A-C in the contact lens body 320, but in other embodiments, the contact lens may include many femtoprojectors (e.g., 25, 50, etc.), or may include as few as one femtoprojector. If there is only one femtoprojector 310 in a contact lens body 320, it need not be in the center of the contact lens. The femtoprojectors 310 are, more generally, located in a central region of the contact lens 120 which is surrounded by a conductive coil 330. The conductive coil 330 is connected to the femtoprojectors 310 and other electronics via embedded connectors 332. Example embedded connectors are described in U.S. patent application Ser. No. 16/047,737 filed on Jul. 27, 2018 titled "Electrical Interconnects Within Electronic Contact Lenses," which is incorporated by reference herein in its entirety.

The entire display, made up of all the femtoprojectors, may be a variable resolution display that generates only the resolution that each region of the eye can actually see, vastly reducing the total number of individual "display pixels" required compared to displays of equal resolution and that are not eye-mounted. Pixels in an eye-mounted display that are viewed by lower resolution off-foveal regions of the retina will always be viewed by those lower resolution regions and, therefore, can project lower resolution pixels on the retina while still matching the eye's resolution.

The contact lens body 320 is roughly divided by the dashed circle into an optical zone 322 and a non-optical zone 324. Components in the optical zone 322 may be in the optical path of the eye, depending on how far open the iris is. Components in the non-optical zone 324 fall outside the aperture of the eye. Accordingly, optical components are generally positioned in the optical zone 322 while other components are positioned in the non-optical zone 324. For example, femtoprojectors 310 are within the optical zone 322 while the conductive coil 330 is in the non-optical zone 324.

The contact lens 120 may also include other components such as antennae (e.g., a high frequency radio antenna) or optical/infrared photodetectors, a high frequency radio, data storage and buffering, controls, and a calibration system (including, for instance, a motion detection system and a display shift system). The contact lens may also include a power circuit to generate power for components of the contact lens from time varying currents generated by the conductive coil. In addition, the contact lens 120 may include positioning components such as accelerometers, magnetometers, and/or gyroscopes used for motion detection, eye tracking, and/or head tracking. Finally, the contact lens 120 may also include data processing components, such as microprocessors, microcontrollers, and other data processing elements.

Inductance and Magnetic Field of Solenoids

In FIG. 2 and FIG. 3, the coil 210 of conductive material in the necklace 110 and the conductive coil 330 in the contact lens 120 are illustrated as conductive loops that encircle the wearer's neck and the optical zone 322 of the eye, respectively. In various other examples of an AR system 100, solenoids may be used instead.

A solenoid is a wire shaped into a number N of conductive loops that form a tightly packed coil (e.g., a helix), though, in some examples, some portions of the coil may be overlapping. To illustrate, the conductive loops may be connected in series and wrapped such that they form layers about a center. In some embodiments, a solenoid has a length l that is substantially greater than its diameter D, and, further, the solenoid may be fabricated from a fixed volume V of wire. In other examples, a solenoid fabricated from a volume V of wire may be shaped into various solenoids having any configuration of length l, diameter D, and number N of turns such that the total volume of wire in the solenoid is V. As such, solenoids may be made with differing aspect ratios of l/D. Further, given a fixed volume V of wire, a solenoid may be made with many, thin turns, or fewer, thick turns. In various configurations, a solenoid embedded in a contact lens may have a length l ranging from 0.5 mm to 20 mm, a diameter D ranging from 0.1 mm to 2.0 mm, and a volume V that fits inside a contact lens. Generally, the aspect ratio l/D of an embedded solenoid is at least 10, but could be any aspect ratio greater than 1. For solenoids that have a non-circular cross-section, the aspect ratio and other measures may be defined using the effective diameter=sqrt(4A/π) where A is the cross-sectional area of the solenoid.

In some configurations, the conductive loops of a solenoid are wrapped around a core. The core may be fabricated from materials such as, for example, ferrite materials. Ferrites are ceramic compounds of the transition metals with oxygen. Some example ferrites include manganese-zinc ferrite and nickel-zinc ferrite. The core may also be an iron based alloy, such as, for example, NANOPERM®. In some examples, the core may be surrounded by an insulator material. In other configurations, the coil of a solenoid includes conductive loops that form a cavity at the center of the coil.

Passing a time varying current ("TVC") through conductive loops forming coils in a solenoid causes the solenoid to generate a TVMF. For a solenoid with air at its center, the generated magnetic field may be determined as:

$$B = \mu_0 \frac{NI}{l} \quad (1)$$

where B is the magnetic field, N is the number of turns in the coil, l is the length of the solenoid, $\mu_0$ is the magnetic permeability of free space, and I is the amount of current passing through the coil.

Introducing a core with higher permeability increases the generated magnetic field. For example, inclusion of a core formed from a ferromagnetic material (e.g., iron) increases the magnitude of the generated magnetic field B. The generated magnetic field may be determined as:

$$B = \mu_0 \mu_{eff} \frac{NI}{l} \quad (2)$$

where B is the magnetic field, N is the number of turns in the coil, l is the length of the solenoid, $\mu_0$ is the magnetic permeability of free space, and I is the amount of current passing through the coil. The new factor $\mu_{eff}$ accounts for the effect of the core on the solenoid performance. It is the effective magnetic permeability of the solenoid, taking into account the effects of the core but also the overall geometry of the core and solenoid. It is not to be confused with the relative permeability, which is a material characteristic. For example, a ferrite material used in the core will have a certain relative permeability.

Figure 4A:
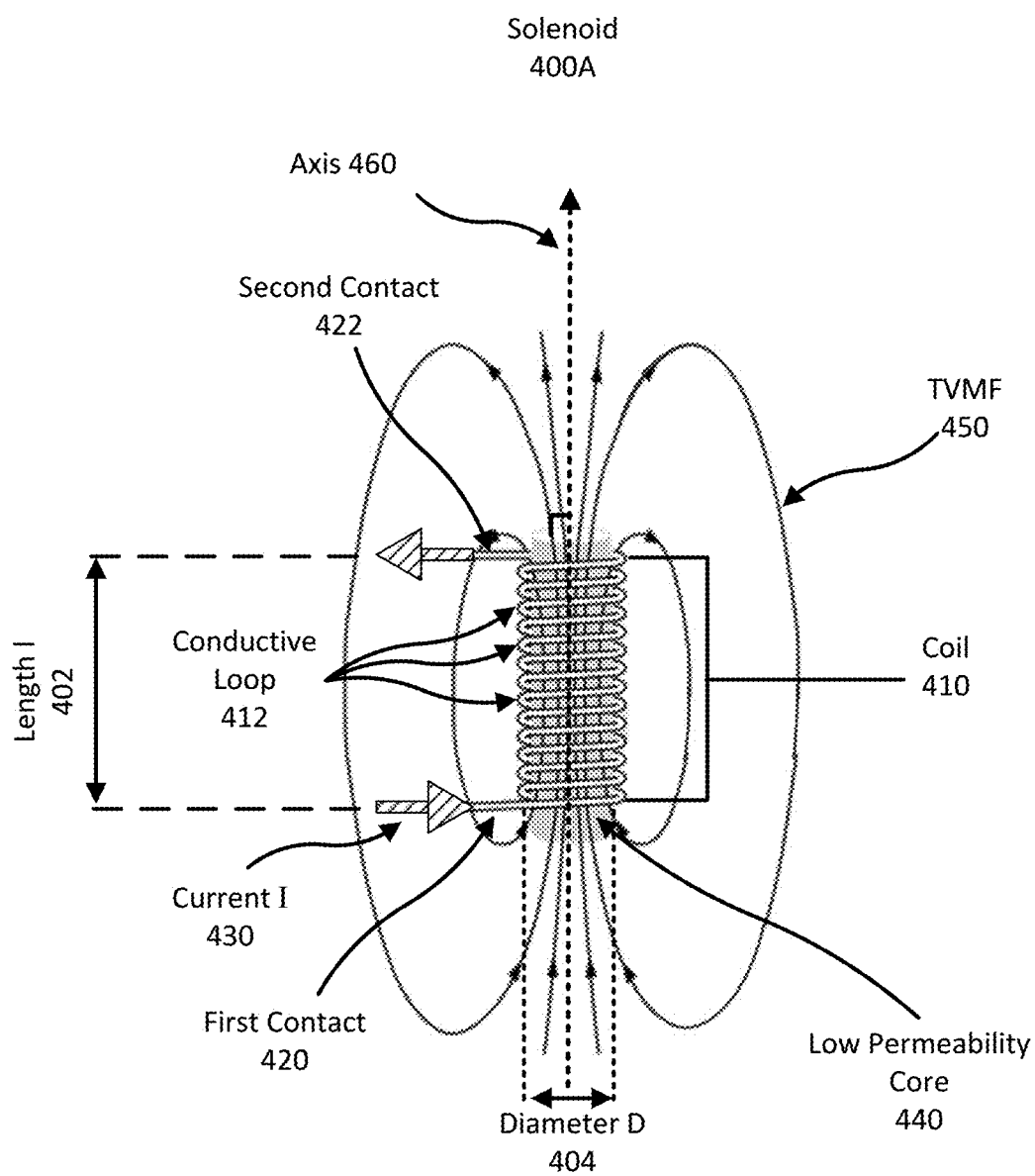
FIG. 4A is a diagram of a solenoid including a low permeability core.
Figure 4B:
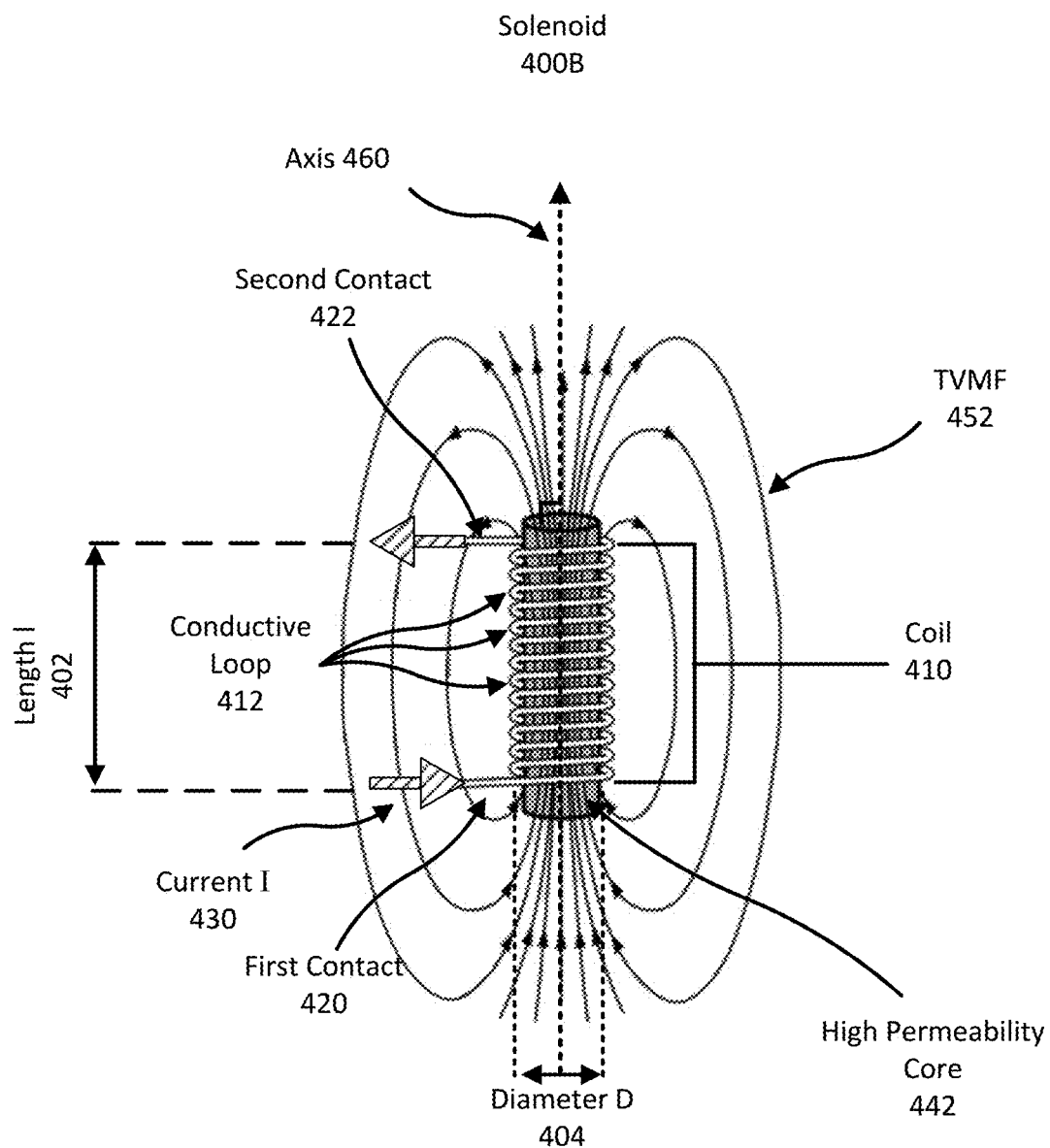
FIG. 4B is a diagram of a solenoid including a high permeability core.

As an example, FIGS. 4A and 4B illustrate a solenoid with a low permeability core and a high permeability core, respectively, along with the magnetic fields generated by the solenoids. In FIG. 4A, a solenoid 400A includes a coil 410 of conductive material with a first contact 420 and a second contact 422. The contacts can be connected to other elements of the AR system 100. The coil 410 includes a number N of conductive loops 412 along the length l 402 of the solenoid. The conductive loops 412 are looped around a low permeability core 440 (e.g., plastic) with diameter D 404. In some cases, a solenoid with a coreless center functions similarly to a solenoid with a low permeability core.

A current 1430 (illustrated as a striped arrow) may flow through the solenoid 400A via the first contact 420 and second contact 422. The current 1430 travelling through the conductive loops 412 generates a TVMF 450. The TVMF 450 generated by the solenoid 400A is illustrated as contours of equivalent magnetic field magnitudes with the arrows of each contour indicating the direction of the magnetic field vector at that point of the contour.

FIG. 4A also illustrates a central axis 460 (illustrated as a dashed arrow) of the solenoid 400A. The central axis 460 can be determined based on the magnetic field lines. In this example, the solenoid has a cylindrical shape, so the axis 460 is a straight line through the center of the solenoid.

The solenoid 400B of FIG. 4B is similar to the solenoid 400A of FIG. 4A in that it has a similar length l 402, number of turns N, and diameter D 404 (i.e., it encloses the same volume). The solenoid 400B also has a similar current 1430 passing through the coil 410. However, the solenoid 400B of FIG. 4B includes a high permeability core 442 (e.g., ferrite) that increases the effective permeability of the solenoid 400B. As such, the TVMF 452 generated by the solenoid 400B in FIG. 4B is greater than the TVMF 450 generated by the solenoid 400A in FIG. 4A. The increased TVMF 452 strength is illustrated as a higher density of magnetic field contours within the coils 410 of the solenoid 400B.

As noted above, a solenoid can produce a TVC in the presence of a TVMF. That is, if the conductive loops of a solenoid are in the presence of a TVMF, the solenoid can generate a TVC. The TVC may be used to generate energy for electrical components connected to the solenoid. By way of illustration, referring to FIG. 4B, a solenoid 400B is present in a TVMF 452. The conductive coil 410 of the solenoid generates a current 430 in solenoid 400B that passes through the first contact 420 and second contact 422. That is, in this interpretation of FIG. 4B, rather than passing a current 430 through the conductive coil 410 of a solenoid 400B to generate a TVMF 450, the conductive coil 410 of a solenoid 400B, in the presence of a TVMF 450, generates a current 430 that may be used by electrical components connected to the first contact 420 and second contact 422. A solenoid with a high permeability core generates a greater magnitude current 430 from a TVMF 450 than the same solenoid with a low permeability core or that is coreless. That is, the solenoid 400B of FIG. 4B generates a larger magnitude TVC than the solenoid 400A of FIG. 4A in the presence of a similar TVMF.

A solenoid has an inductance L. The inductance L for a solenoid with a coreless center is:

$$L = \mu_0 \frac{N^2 A}{l} \quad (3)$$

and the inductance for a solenoid with a core is:

$$L = \mu_0 \mu_{\mathit{eff}} \frac{N^2 A}{l} \quad (4)$$

where L is the inductance, N is the number of turns in the coil, l is the length of the solenoid, $\mu_0$ is the magnetic permeability of free space, A is the cross-sectional area of the solenoid, and $\mu_{\mathit{eff}}$ is the effective magnetic permeability of the solenoid. A solenoid with a higher permeability core has a higher inductance relative to a solenoid with a coreless center or with a low permeability core, due to the increase in the effective permeability of the solenoid.

The characteristics (e.g., diameter D, length l, number of coils N, etc.) of a solenoid may be selected to improve performance of the AR system 100. For example, if a solenoid is used to transfer power between a contact lens 120 and a necklace 110, the characteristics are selected such that the quality factor Q of the solenoid increases. In this example, performance may improve because increasing the quality factor Q reduces the power loss between the necklace 110 and contact lens 120. In another example, if the solenoid is used to determine an orientation, the characteristic are selected such that the voltage induced in the solenoid increases. In this example, performance may improve because increasing the voltage generated when determining an orientation may increase the sensitivity of the orientation determination.

Additionally, the material used in the core of a solenoid may be selected to increase the performance of the AR system 100. For example, the effective permeability $\mu_{\mathit{eff}}$ of a solenoid is affected by the permeability $\mu_i$ of the material in the core. Increasing the core's permeability increases the effective permeability $\mu_{\mathit{eff}}$ of the solenoid and, thereby, increases the performance for the AR system. For example, for two solenoids that are the same except for different materials in their cores, the solenoid having the core with the greater permeability has a larger inductance L.

Figure 5A:
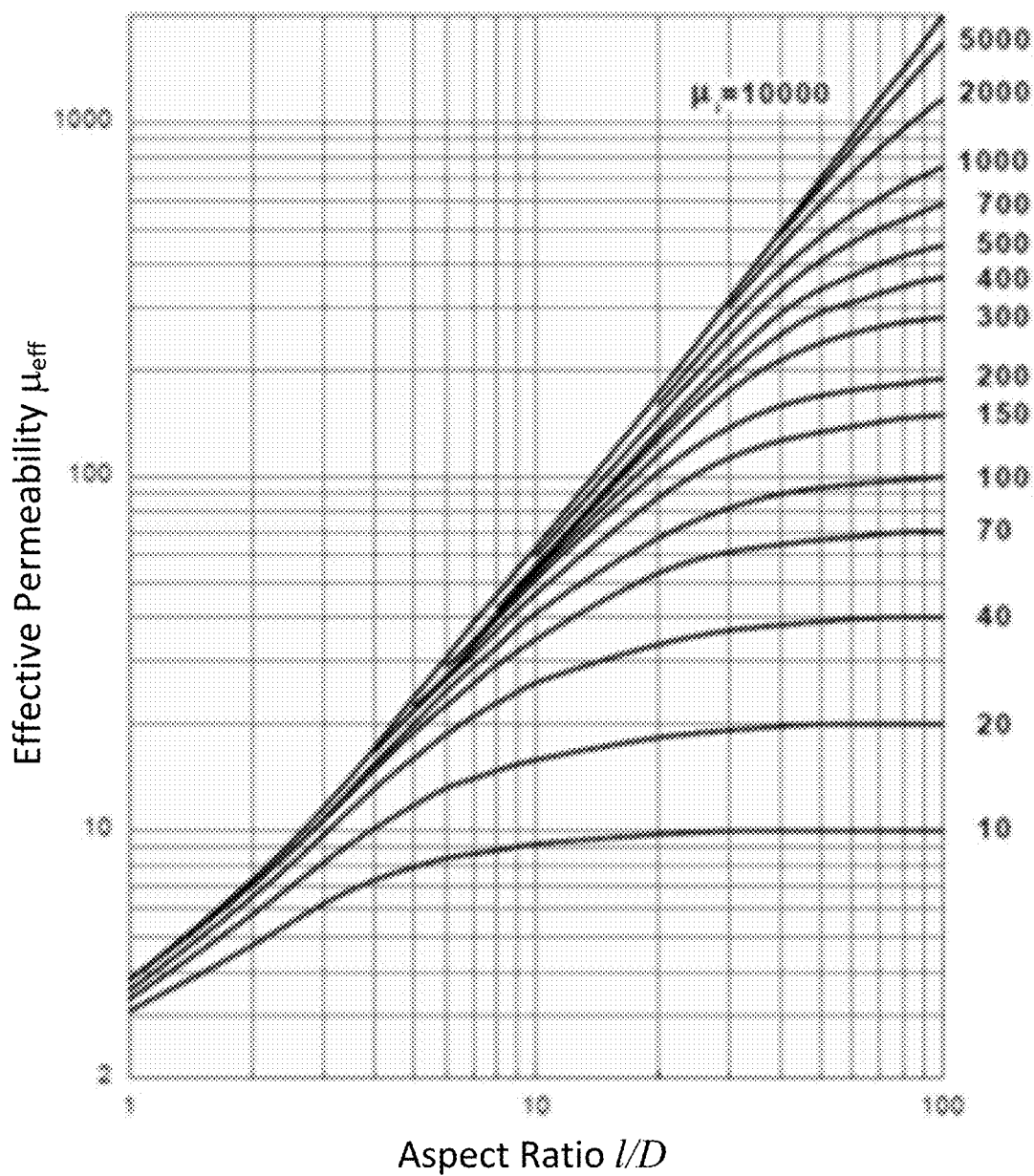
FIG. 5A is a log-log plot of the effective permeability of solenoids with different cores as a function of aspect ratio for the solenoid.
Figure 5B:
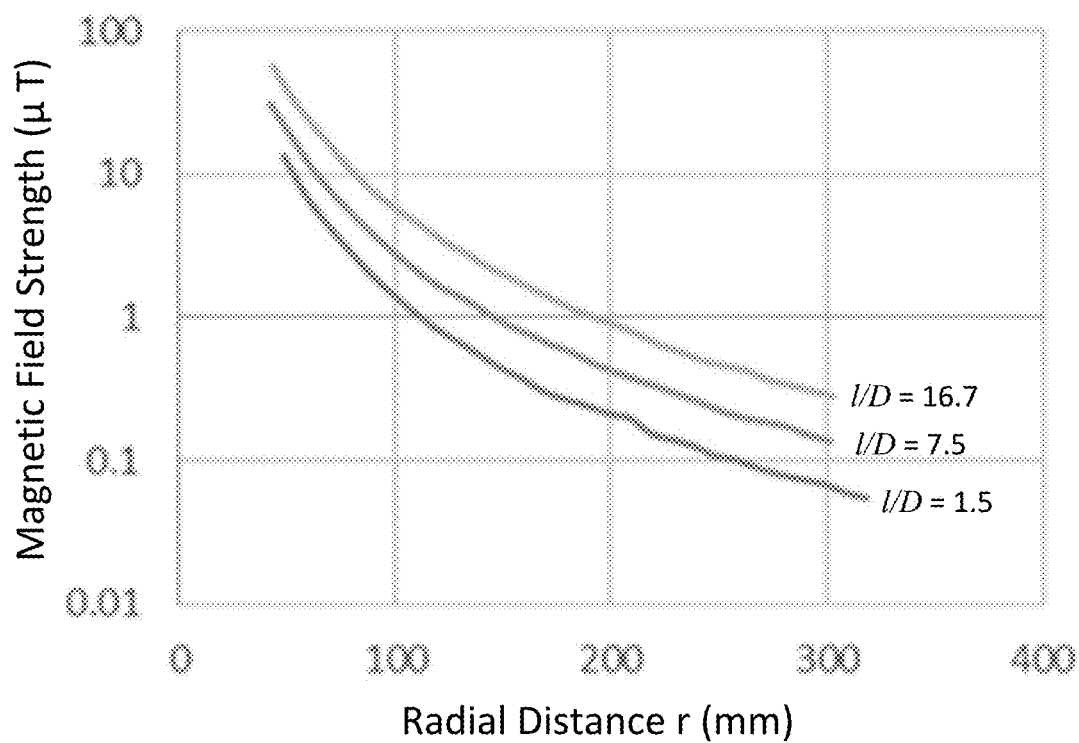
FIGS. 5B and 5C are semi-log plots of measured magnetic field strength as a function of distance from a solenoid for solenoids of different aspect ratios.
Figure 5C:
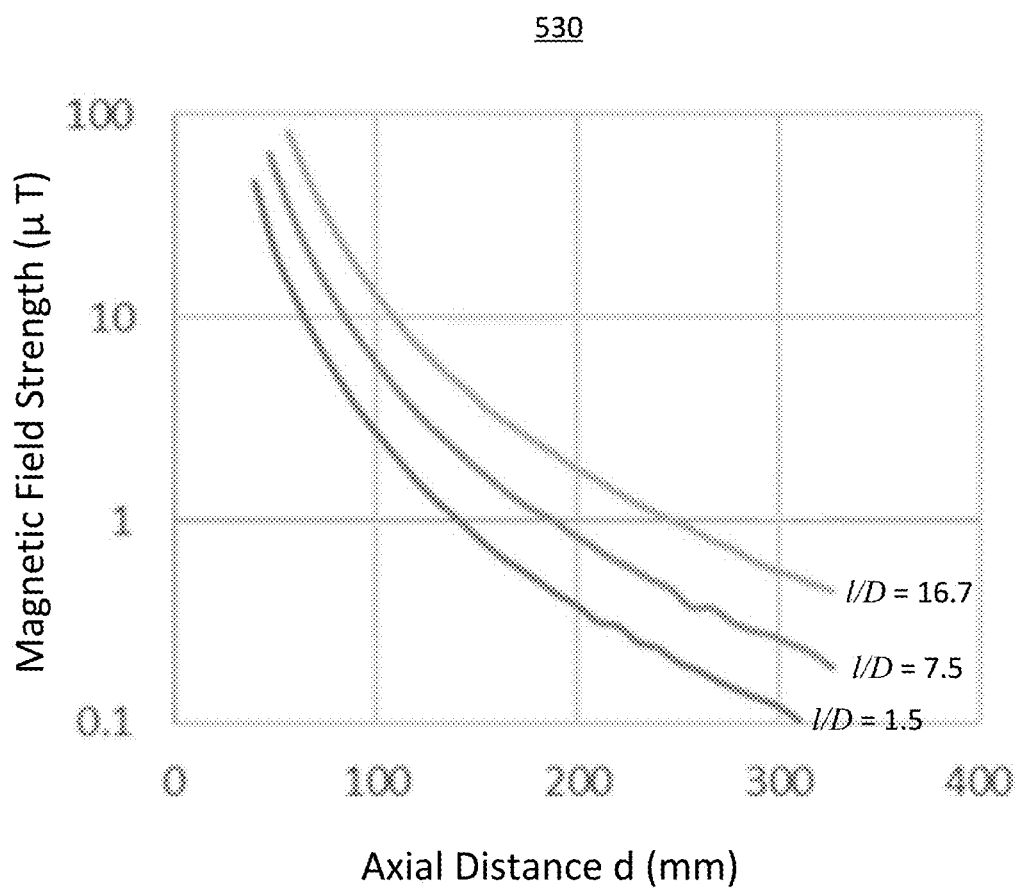

FIGS. 5A-5C illustrate the effects of core permeability $\mu_i$ and aspect ratio on the characteristics of a solenoid. FIG. 5A is a log-log plot 510 illustrating the effective permeability $\mu_{\mathit{eff}}$ of solenoids using different materials for their core and as a function of aspect ratio. In the plot, the x-axis is the aspect ratio l/D of the solenoid and the y-axis is the effective permeability $\mu_{\mathit{eff}}$. Additionally, each curve in the figure represents a core using a different material with permeability $\mu_i$. The permeability $\mu_i$ for each curve is shown by the labels along the right axis of the graph. Generally, for each curve, there is a range of aspect ratios where the effective permeability $\mu_{\mathit{eff}}$ increases as some power of the aspect ratio (l/D). However, at some point, the effective permeability $\mu_{\mathit{eff}}$ remains relatively constant despite increasing aspect ratios.

FIG. 5B is a semi-log plot 520 illustrating the magnetic field strength generated by a solenoid measured at a radial distance r from the midpoint of the solenoid. In plot 520, the y-axis is the measured magnetic field strength (in µT) and the x-axis is the distance r (in mm). In this example, the distance r is the distance from the center axis of the solenoid on a plane perpendicular to the axis of the solenoid that bisects the solenoid. Each curve on the graph represents a different solenoid having a different aspect ratio l/D, ranging from 1.5 to 16.7. The aspect ratio for a solenoid is shown next to its corresponding curve on the plot 520. For each solenoid, the input current and the characteristics of the solenoid (other than the aspect ratio) are substantially similar. As shown, increasing the aspect ratio of a solenoid generates a greater magnetic field at all distances r. FIG. 5C is a similar plot 530 to FIG. 5B. However, in this example, the magnetic field is measured at an axial distance d from the midpoint of the solenoid. That is, the distance d is the distance from the midpoint of the solenoid along the axis of the solenoid. Again, solenoids with increasing aspect ratio generate a greater magnetic field at all distances d.

Eye Motion and Generated Time-Varying Current

As described above, a power source is inductively coupled to a solenoid within a contact lens 120 via a TVMF. The magnitude of the induced TVC within the solenoid of the contact lens (a "receiver solenoid") depends on the relative orientation between the solenoid and the direction of the TVMF.

The receiver solenoid may be embedded in a contact lens 120. Take, for example, a power source which is a solenoid that generates a TVMF (a "source solenoid"). In this example, the source solenoid and receiver solenoid may be strongly coupled when the axes defined by the source solenoid and receiver solenoid are parallel and may be weakly coupled when the axes are orthogonal, but other parameters may also affect the coupling. Here, the receiver solenoid may generate a greater magnitude TVC when the source solenoid and receiver solenoid are strongly coupled than when they are weakly coupled. Some additional parameters that may also affect the coupling between two solenoids are, for example, the distance between solenoids and the inductance between solenoids.

Figure 6:
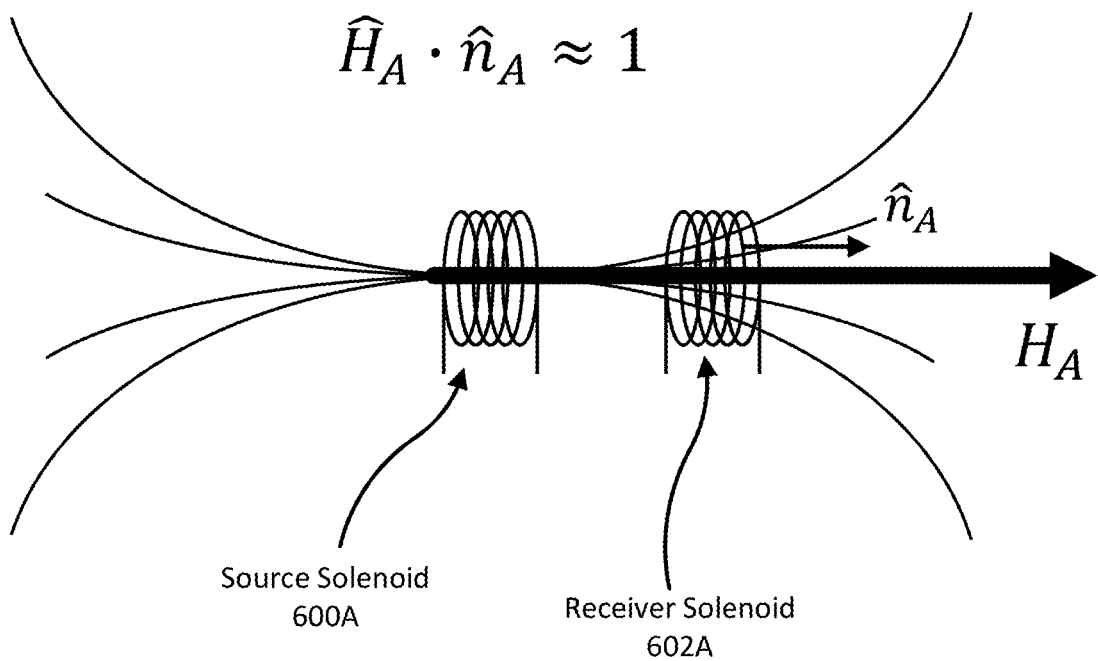
FIG. 6 is a diagram illustrating a strong inductive coupling and a weak inductive coupling between a source coil and a receiver solenoid.
Figure 6:
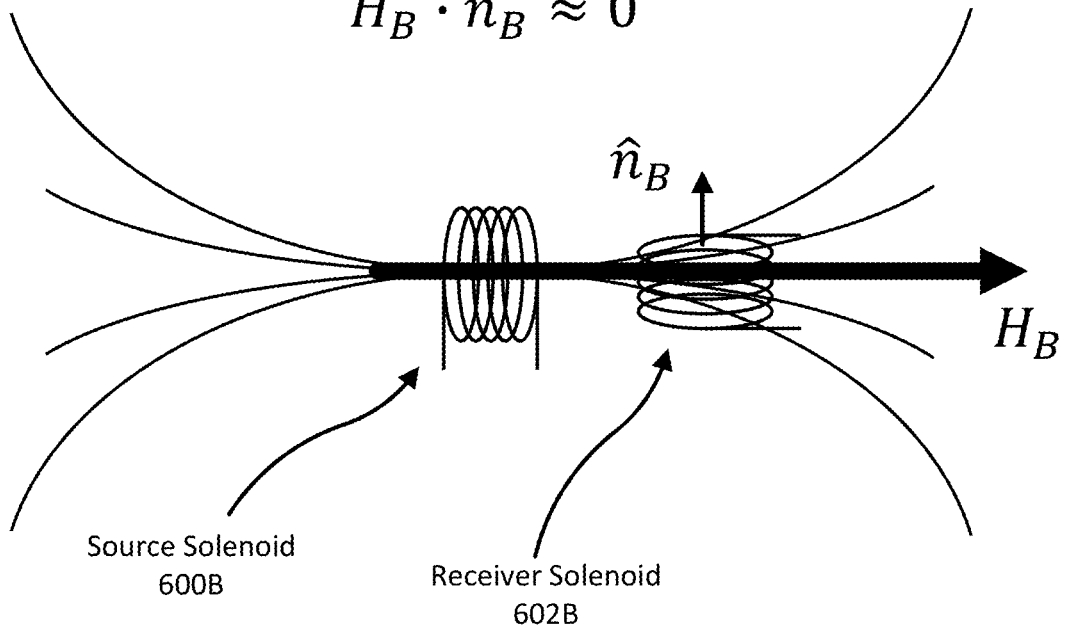

To illustrate, FIG. 6 is a diagram illustrating the effect of relative axis orientation on inductive coupling between a source solenoid and a receiver solenoid. In the illustrated example, the source solenoids and receiver solenoids are similar except that are oriented differently with respect to each other. An example of strong inductive coupling is shown between a first source solenoid 600A and a first receiver solenoid 602A. The first source solenoid 600A generates a TVMF in a direction indicated by the vector $\vec{H}_A$. The vector $\vec{H}_A$ is collinear with the central axis of the first receiver solenoid 602A, which is in the direction of unit vector $\hat{n}_A$. As a result, the inductive coupling between the first source solenoid 600A and the first receiver solenoid 602A, represented by the dot product $\hat{H}_A \cdot \hat{n}_A \sim 1$, is a strong coupling, where $\hat{H}_A$ is the unit vector in the direction of $\vec{H}_A$.

An example of weak inductive coupling is illustrated in FIG. 6 between a second source solenoid 600B and a second receiver solenoid 602B. The second source solenoid 600B generates a TVMF in a direction indicated by the vector $\vec{H}_B$. The vector $\vec{H}_B$ is perpendicular to the central axis of the second receiver solenoid 602B, represented by the unit vector $\hat{n}_B$. As a result, the inductive coupling between the second source solenoid 600B and the second receiver solenoid 602B, represented by the dot product $\hat{H}_B \cdot \hat{n}_B \sim 0$, is a weak coupling.

Thus, strong coupling between solenoids may occur when the angle θ between the direction of the TVMF produced by a source solenoid and the central axis of receiver solenoid is zero or close to zero (e.g., 20 degrees or less, 10 degrees or less, and the like). This results in the generation of an increased magnitude of TVC relative to a weaker coupling. Likewise, weak coupling between solenoids may occur when the angle θ between the axes of the two solenoids is 90 degrees or close to 90 degrees (e.g., 70 degrees or more, 80 degrees or more, and the like). Weak coupling may result in the generation of a reduced magnitude of TVC relative to strong coupling.

Referring back to FIG. 1, the necklace 110, which can may include a source solenoid or other type of source coil, can generate a TVMF and can transmit power and/or data to a receiver solenoid embedded in the contact lens 120 via inductive coupling. Generally, the necklace 110 is worn around a user's neck during operation of the AR system 100. As a result, the direction of the TVMF produced by the necklace 110 is generally consistent, and the strength of coupling between a contact lens 120 worn by a wearer of the necklace and the necklace 110 itself varies as the orientation of the contact lens 120 relative to the necklace 110 varies. Therefore, the magnitude of the generated TVC varies as the orientation of the contact lens 120 varies.

Figure 7A:
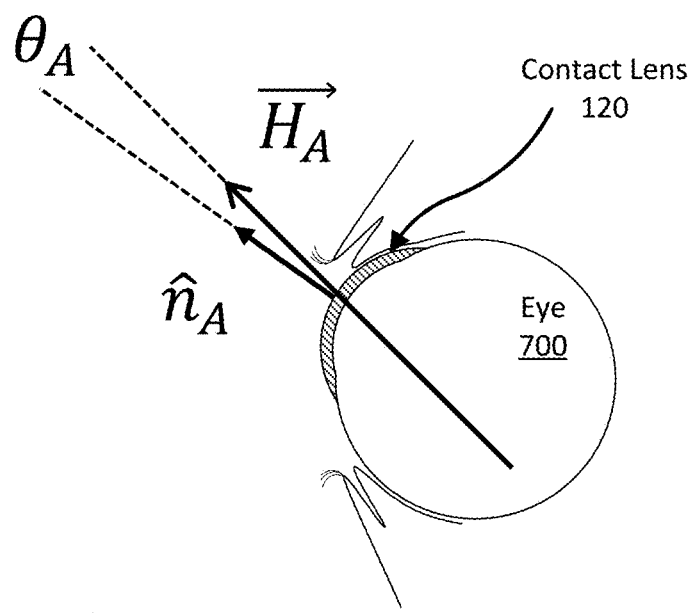
FIGS. 7A-7C show various orientations of an eye wearing an electronic contact lens in the presence of a magnetic field as the eye moves within the eye socket.
Figure 7B:
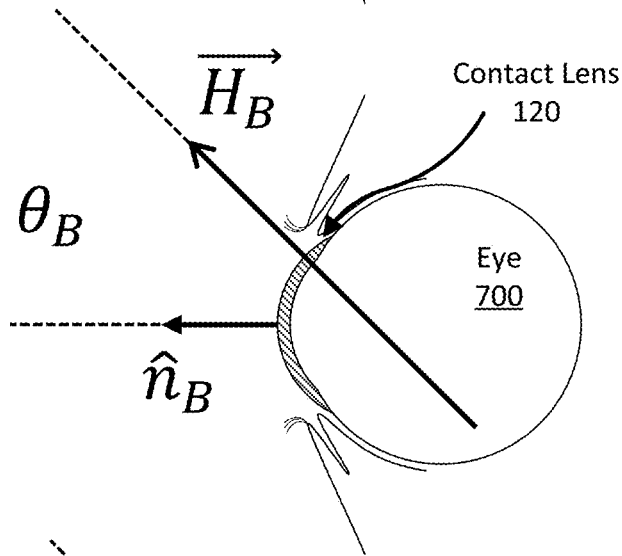
Figure 7C:
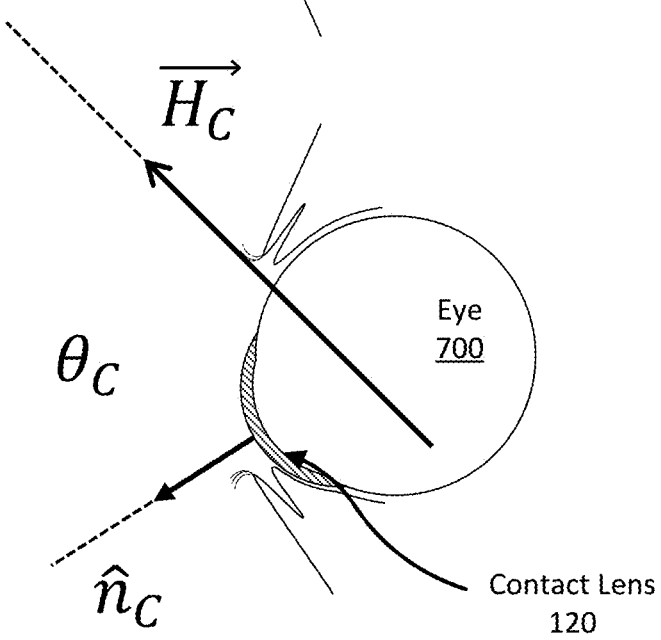

FIGS. 7A-7C show various orientations of an eye 700 wearing an electronic contact lens 120 in the presence of a TVMF as the eye 700 moves within the eye socket. In the example of FIG. 7A, an eye 700 is looking upwards and $\theta_A$ is the angle between the direction of the TVMF $\vec{H}_A$ produced by a necklace 110 and the vector $\hat{n}_A$ defined by the central axis of an embedded solenoid. Here, $\hat{n}_A$ and $\vec{H}_A$ are nearly parallel and the contact lens 120 is strongly coupled to the source and the embedded solenoid generates an amount of TVC $I_A$.

In the example of FIG. 7B, an eye 700 is looking forwards, and the angle between the direction of the TVMF $\vec{H}_B$ produced by a necklace 110 and the vector $\hat{n}_B$ defined by the central axis of an embedded solenoid is $\theta_B$. In this example, $\hat{n}_B$ and $\vec{H}_B$ are not parallel and are less strongly coupled. Accordingly, the embedded solenoid generates and amount of TVC $I_B$. Here, because the solenoids are less strongly coupled than in FIG. 7A, $I_B$ is less than $I_A$.

Finally, in the example of FIG. 7C, an eye 700 is looking downwards, and the angle between the direction of the TVMF $\vec{H}_C$ produced by a necklace 110 and the vector $\hat{n}_C$ defined by the central axis of an embedded solenoid is $\theta_C$. In this example, $\hat{n}_C$ and $\vec{H}_C$ are nearly orthogonal and are weakly coupled. The embedded solenoid of the contact lens generates an amount of TVC $I_C$. In this example, because the two are less strongly coupled than in FIG. 7B, $I_C$ is less than $I_B$ and $I_A$.

Several solenoids may be embedded within the contact lens 120 (e.g., one, two, three, or more). The embedded solenoids are positioned within the contact lens 120 such that the embedded solenoids produce TVC for a variety of orientations of the user's eye.

Figure 8:
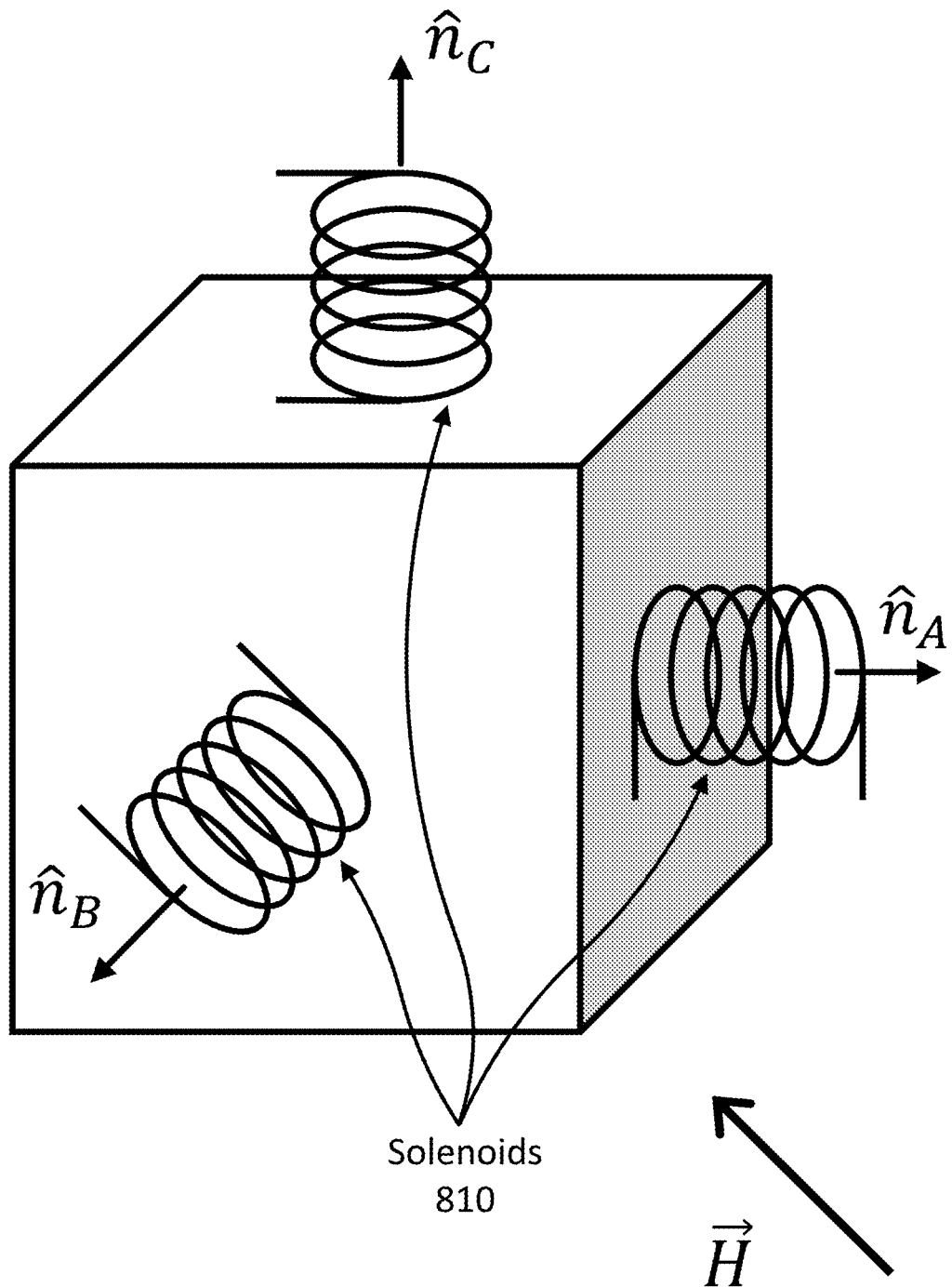
FIG. 8 is a diagram illustrating a combination of solenoids that generate a time-varying current in the presence of a time-varying magnetic field.

To illustrate this, FIG. 8 is a diagram illustrating a combination of solenoids 810 that generate a TVC in the presence of a TVMF. Each solenoid has a central axis $\hat{n}_i$ that is orthogonal to the other two central axes (e.g., $\hat{n}_A \perp \hat{n}_B \perp \hat{n}_C$). In this example, a source generates an arbitrary TVMF $\vec{H}$. Due to the orientations of the solenoids of FIG. 8, at no point are all of the central axes orthogonal to $\vec{H}$. That is, for any $\vec{H}$:

$$\vec{H} \cdot \hat{n}_C + \vec{H} \cdot \hat{n}_B + \vec{H} \cdot \hat{n}_C > 0 \qquad (5)$$

The illustrated orientation of the orthogonal receiver solenoids 810 in FIG. 8 is given as an example to establish the relationship in Equation 5. However, fabricating a contact lens 120 with three orthogonal embedded receiver solenoids is a challenging engineering problem and, in many cases, embedded receiver solenoids in the contact lens may be alternatively positioned. Still, Equation 5 holds for contacts lenses having any arrangement of a set of three receiver solenoids such that no two of the central axes are parallel (i.e., no two of $\hat{n}_A$, $\hat{n}_B$, and $\hat{c}_C$ are parallel). Such a set of receiver solenoids is referred to herein as a non-parallel set of receiver solenoids. In some embodiments, a contact lens 120 may also include one or more additional receiver solenoids. The additional receiver solenoids may be positioned such that their central axes may be parallel or non-parallel to those of the other receiver solenoids.

In addition, a contact lens 120 may include an orientation estimation circuit connected to the solenoids within the contact lens 120. The orientation estimation circuit receives TVCs generated by the embedded solenoids and estimates an orientation of the contact lens 120 based on the TVCs. For instance, the orientation estimation circuit can determine an orientation estimate of the contact lens 120 relative to a field that generates the TVCs, relative to a wearer of the contact lens, relative to a power source, relative to an external object, and/or relative to a reference plane or position. The orientation estimate may be represented by a three-dimensional vector. The orientation estimation circuit may estimate the three-dimensional vector representing the orientation estimate of the contact lens 120 based on the TVCs generated from each of the solenoids. For example, the orientation estimation circuit may estimate the three-dimensional orientation vector by summing a vector representing the orientation of each solenoid relative to a TVMF that generates a TVC in the solenoid. In other cases, the orientation estimation circuit can estimate the orientation using various other methods and information.

Contact Lenses with Embedded Solenoids

Figure 9A:
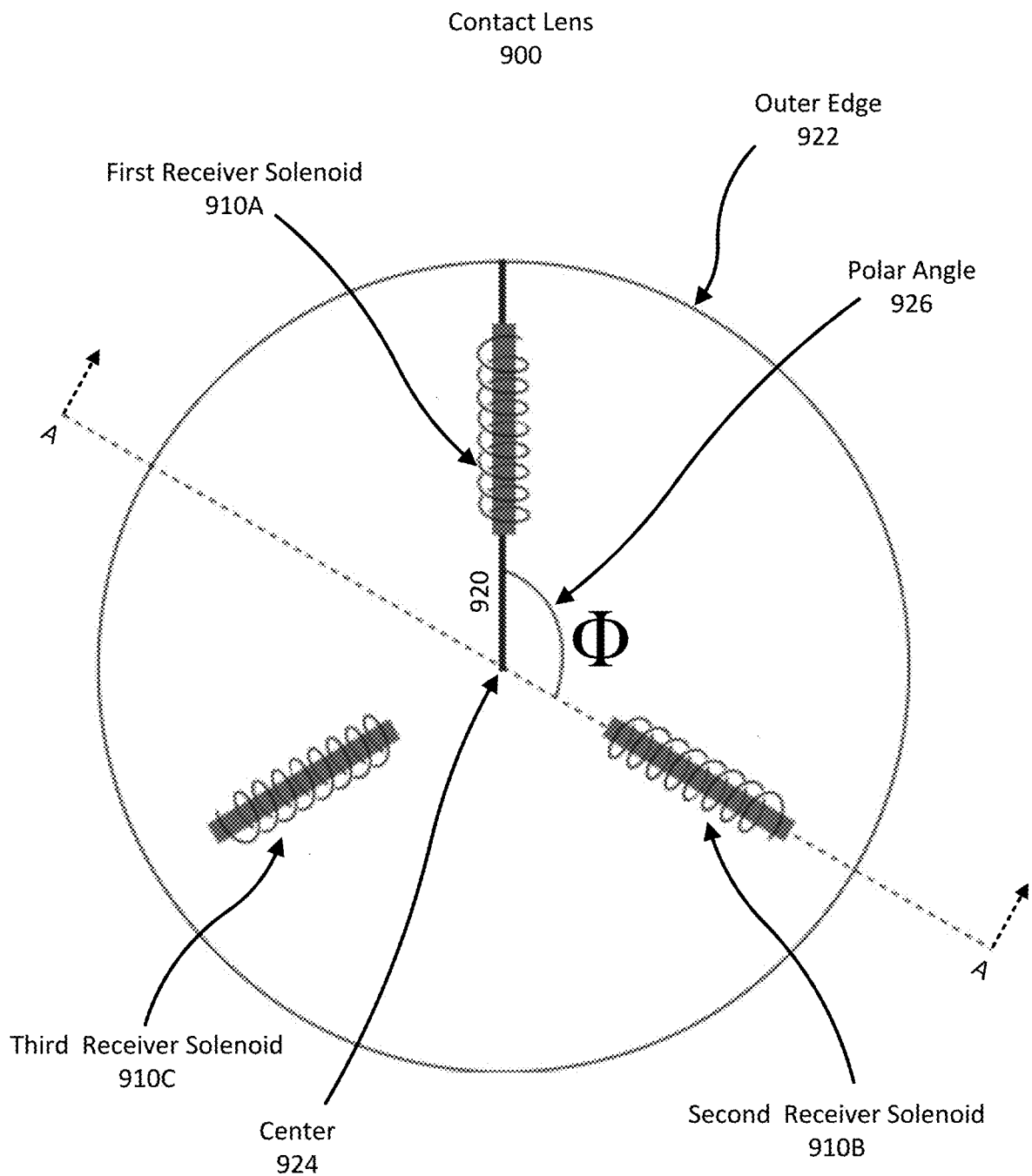
FIG. 9A is a plan view illustration of a contact lens including three embedded solenoids.
Figure 9B:
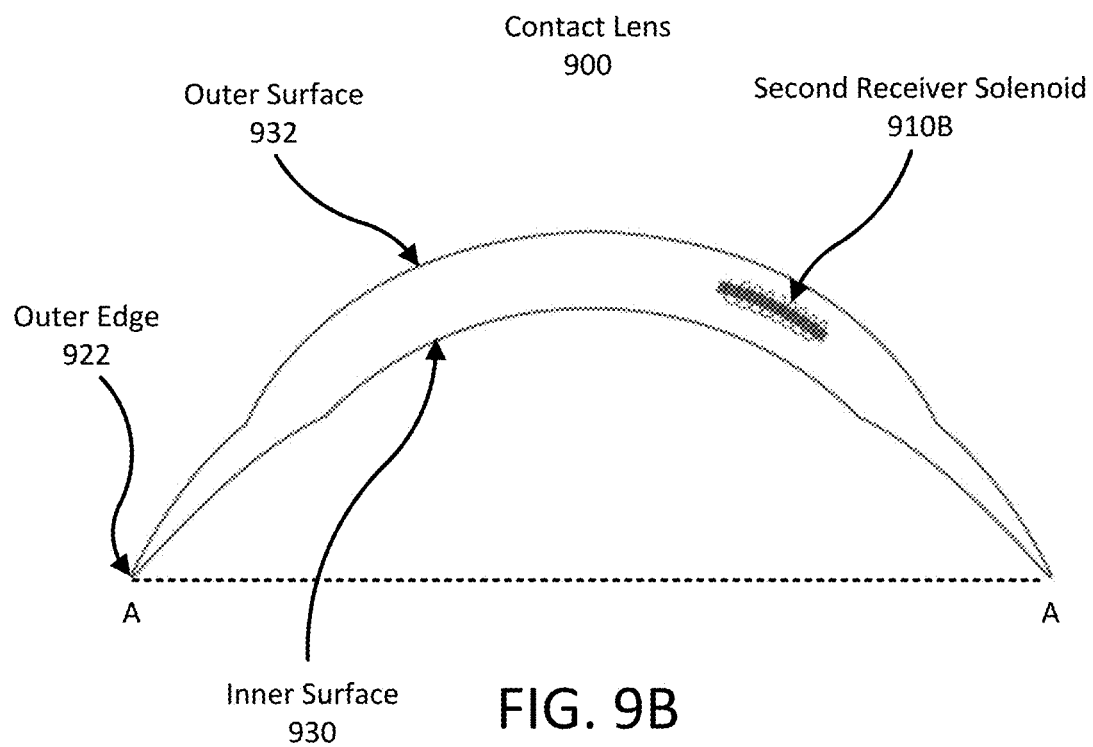
FIGS. 9B-9C are cross-sectional views of a contact lens including embedded solenoids in different orientations.
Figure 9C:
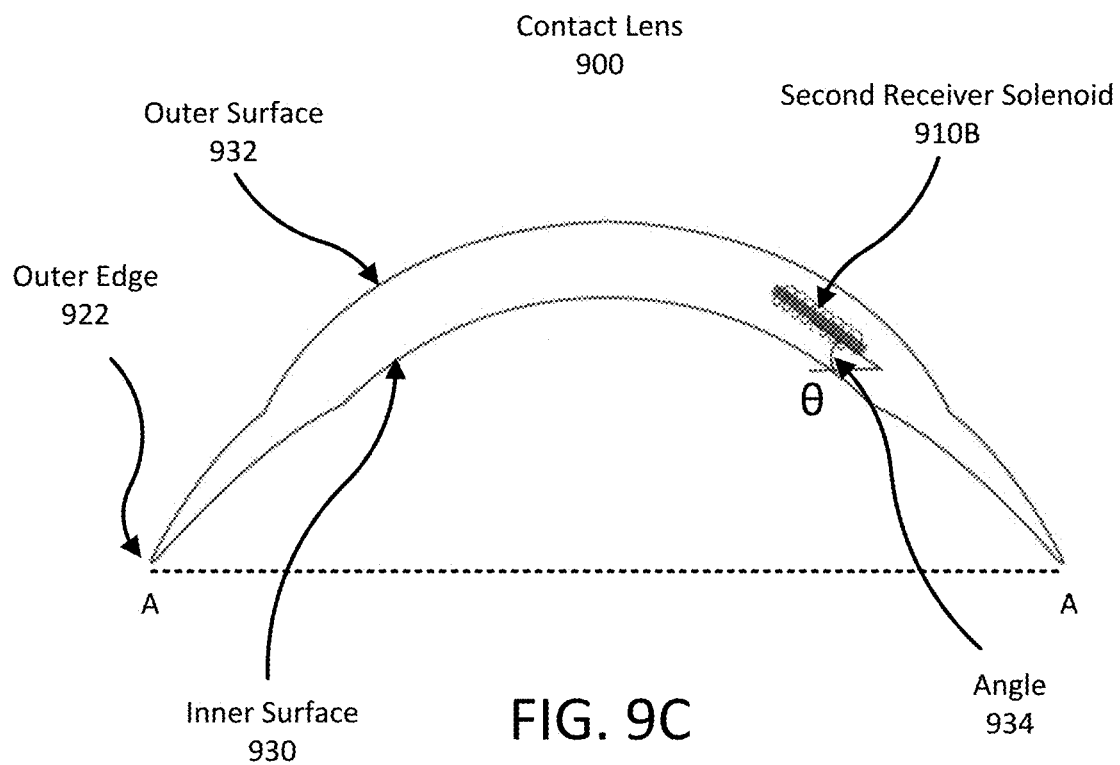

There may be any number of orientations for a set of non-parallel solenoids ("receiver solenoids") in a contact lens. FIGS. 9A-9C illustrate various views of a contact lens 900 including three receiver solenoids 910A-C that generate a TVC when in the presence of a TVMF. FIG. 9A is a plan view illustration of a contact lens 900. The receiver solenoids 910 are illustrated as smaller versions of the solenoid illustrated in FIG. 4B. As such, each of the illustrated receiver solenoids 910 includes a high permeability core. In this example, the core of each receiver solenoid 910 is the same material, but the materials used in the cores could be different between solenoids.

In the illustrated configuration, the first receiver solenoid 910A is positioned such that the axis of the solenoid extends along a radial line 920 toward the center 924 of the contact lens 900A. Similarly, the axes of the second receiver solenoid 910B and third receiver solenoid 910C extend along a radial line (not illustrated) toward the center 924 of the contact lens 900. Here, each receiver solenoid 910 is separated from any neighboring receiver solenoids 910 by a polar angle $\Phi$ 926 of approximately 120°, but could be separated by any other angle $\Phi$ 926.

FIGS. 9B and 9C each illustrate cross-sectional views of contact lenses 900B and 900C, respectively, that have plan views similar to contact lens 900 of FIG. 9A. Each contact lens has an inner surface 930 and an outer surface 932, and includes a set of receiver solenoids 910 embedded between the inner surface 930 and outer surface 932. For example, they may be encapsulated in the material between the two surfaces. In this example, only the second receiver solenoid 910B is visible because FIGS. 9B and 9C are cross-sections.

In the example of FIG. 9B, the second receiver solenoid 910B is curved. It has a curved axis and curved core which approximately match the curvature of the contact lens (e.g., the curvature of the inner surface 930 or outer surface 932).

In the example of FIG. 9C, the second receiver solenoid 910B is straight, with a straight axis and straight core. It forms angle θ 934 with respect to the plane created by the outer edge 922 of the contact lens 900C. In both FIGS. 9B and 9C, the axis of the solenoid is largely parallel to the exterior surfaces of the contact lens 110. In FIG. 9B, the axis is curved to take into account that the contact lens is curved, while the axis of the solenoid in FIG. 9C is straight. In some examples, the length of the receiver solenoid 910B may be greater than the thickness between the inner surface 930 and outer surface 932 of the contact lens 900.

Figure 10A:
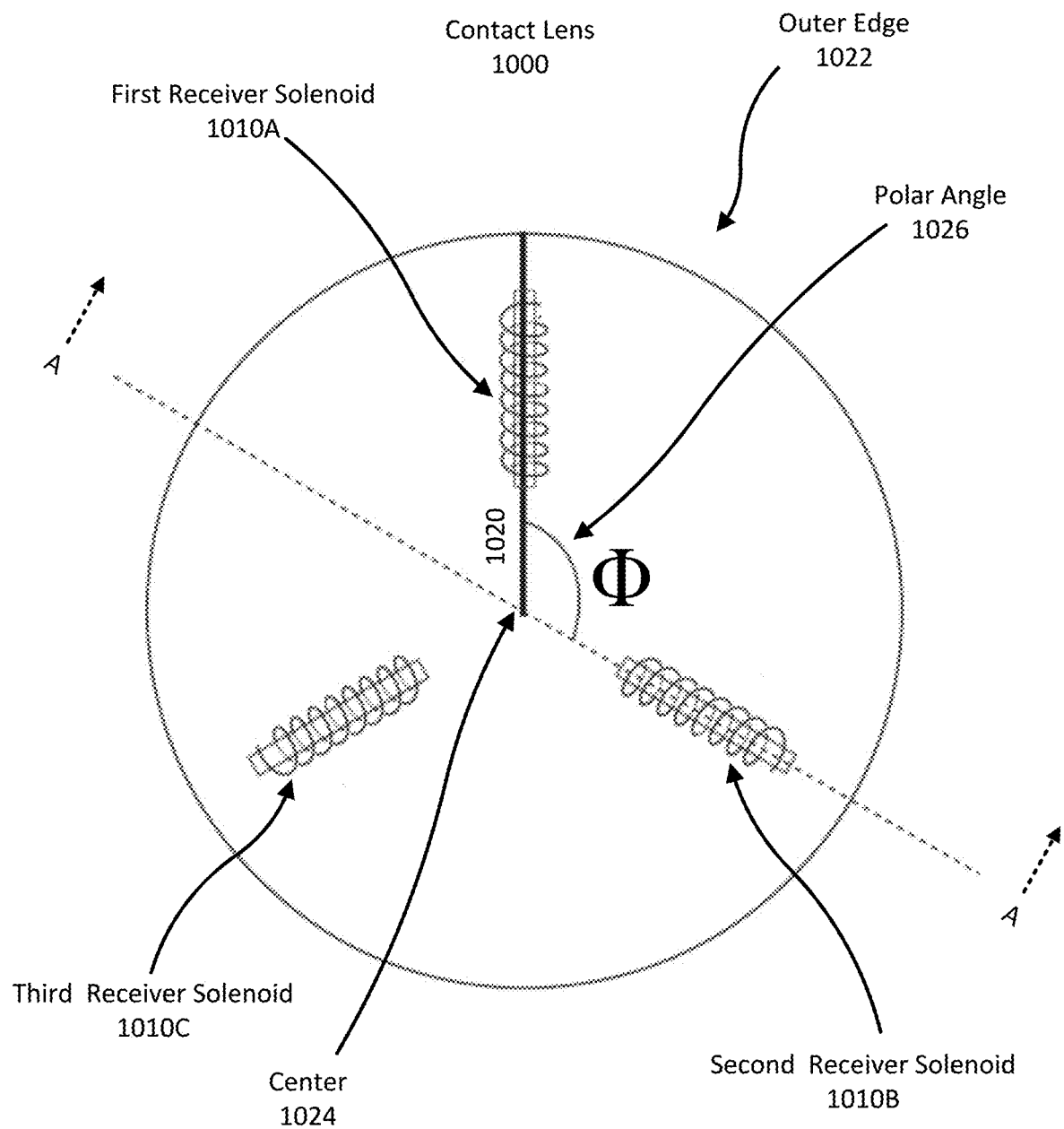
FIG. 10A is a plan view illustration of a contact lens including three embedded solenoids.
Figure 10B:
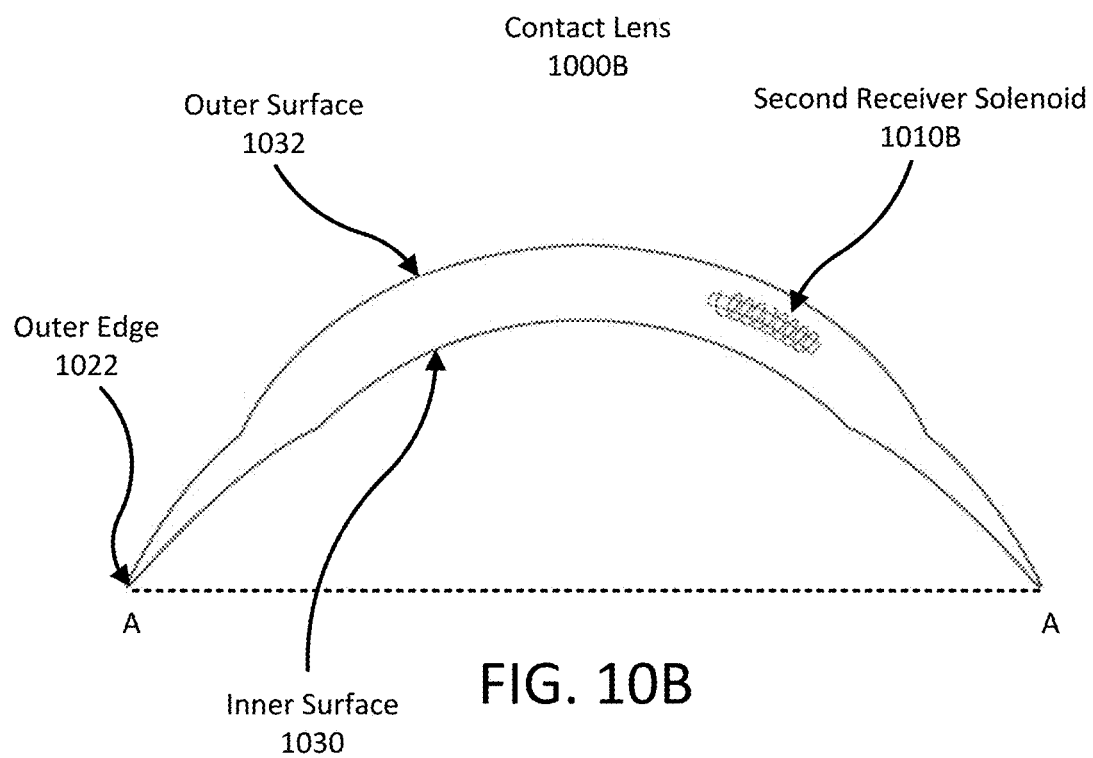
FIGS. 10B-10C are cross-sectional views of a contact lens including embedded solenoids in different orientations.
Figure 10C:
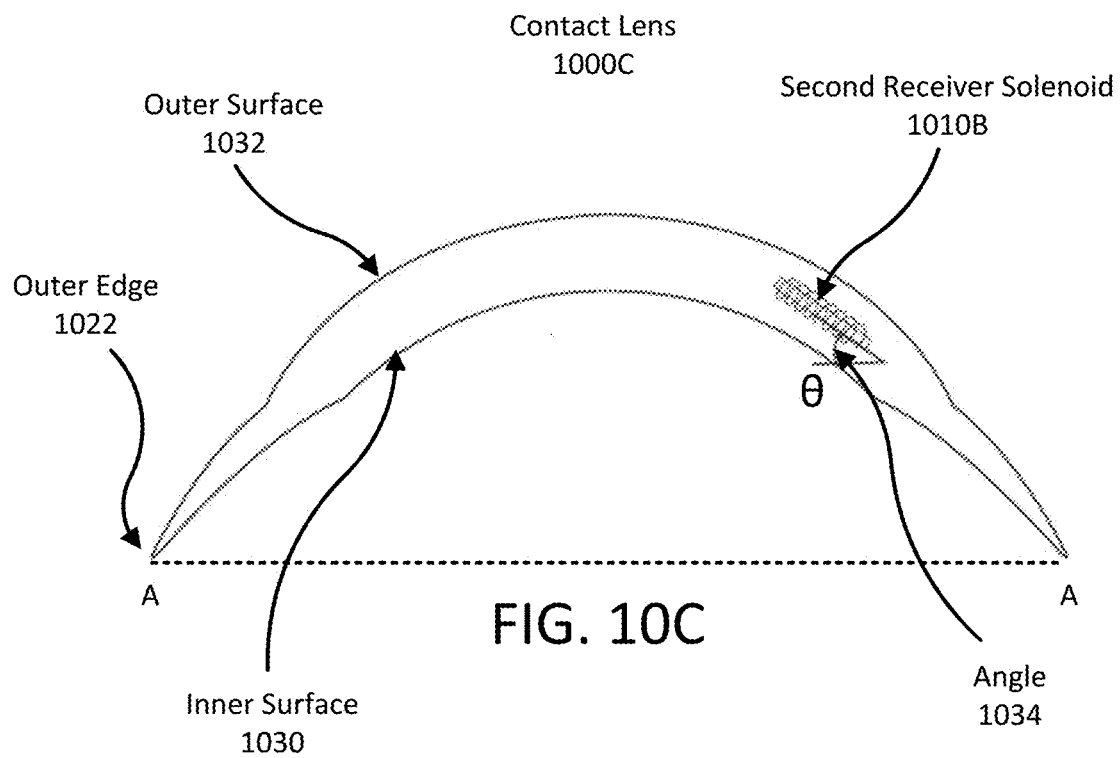

FIGS. 10A-10C show similar contact lenses 1000 to the contact lenses 900 of FIGS. 9A-9C, except the receiver solenoids 1010A-C include a low permeability core rather than a high permeability core. In the figures, the low permeability core is represented by a white rectangle. The white rectangles may also represent a coreless center. The contact lenses include receiver solenoids 1010A-C. As shown in FIG. 10A, the receiver solenoids 1010A-C are positioned such that the axis of each receiver solenoid 1010 and extends along radial lines (e.g., line 1020) from the outer edge 1022 towards the center 1024. The receiver solenoids 1010 are separated by a polar angle Φ 1026.

FIGS. 10B-10C show cross-sections of contact lenses 1010B and 1010C, respectively, which have plan views similar to contact lens 1000. Each contact lens has an inner surface 1030 and an outer surface 1032. The receiver solenoids 1010A-C within contact lens 1000B are curved (e.g., second receiver solenoid 1010B). The receiver solenoids 1010A-C within contact lens 1000C are straight and form angle θ 1034 with respect to the plane created by the outer edge 1022 of the contact lens 1000C (e.g., second receiver solenoid 1010C).

In various other embodiments, receiver solenoids embedded in a contact lens may be otherwise positioned. For example, rather than extending primarily along a radial direction, the solenoids may be oriented so that their axes extend primarily along a polar angular coordinate (i.e., along a concentric circle and roughly parallel to the outer edge of the contact lens. These solenoids may also be either straight or curved, for example with a curvature that matches the curvature of the edge of the contact lens. In another example, a contact lens may include four receiver solenoids that are positioned such that each receiver solenoid is spaced 90° from its neighboring solenoids. In some examples, the receiver solenoids are positioned in the non-optical zone 324 and do not extend into the optical zone 322 of the contact lens.

The aforementioned examples of receiver solenoids contained in a contact lens are not intended to be limiting. Contact lenses may include any combination and number of solenoids positioned within the contact lens in various configurations. In various embodiments, at least three embedded solenoids form a set of non-parallel solenoids such that the system can generate a TVC from a source magnetic field for multiple orientations of the human eye. In an example, the contact lens can include three receiver solenoids with mutually orthogonal axes.

Necklaces with Embedded Solenoids

There may be any number of orientations for a set of solenoids ("source solenoids") in a necklace 110 of an AR system 100. The source solenoids can provide power and data to a contact lens 120 of the AR system. In a similar manner to receiver solenoids, a necklace 110 may include a set of non-parallel source solenoids. That is, a necklace may include an arrangement of three source solenoids such that no two of the set of source solenoids have parallel axes. The set of source solenoids generate a magnetic field such that a single receiver solenoid can generate a TVC for multiple orientations of the eye.

Figure 11A:
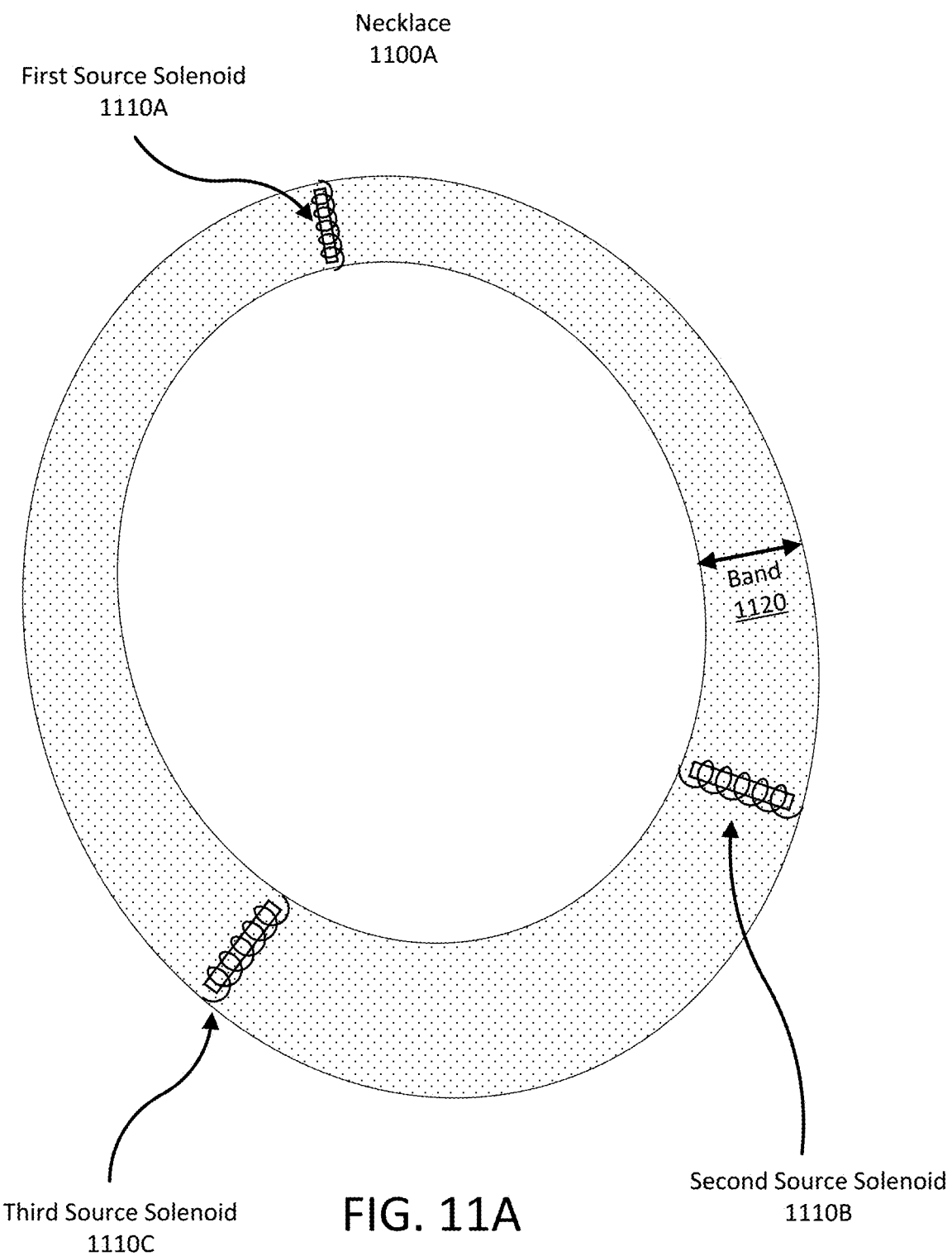
FIGS. 11A-11B are illustrations of a necklace for an AR system including three solenoids embedded in the band of the necklace.
Figure 11B:
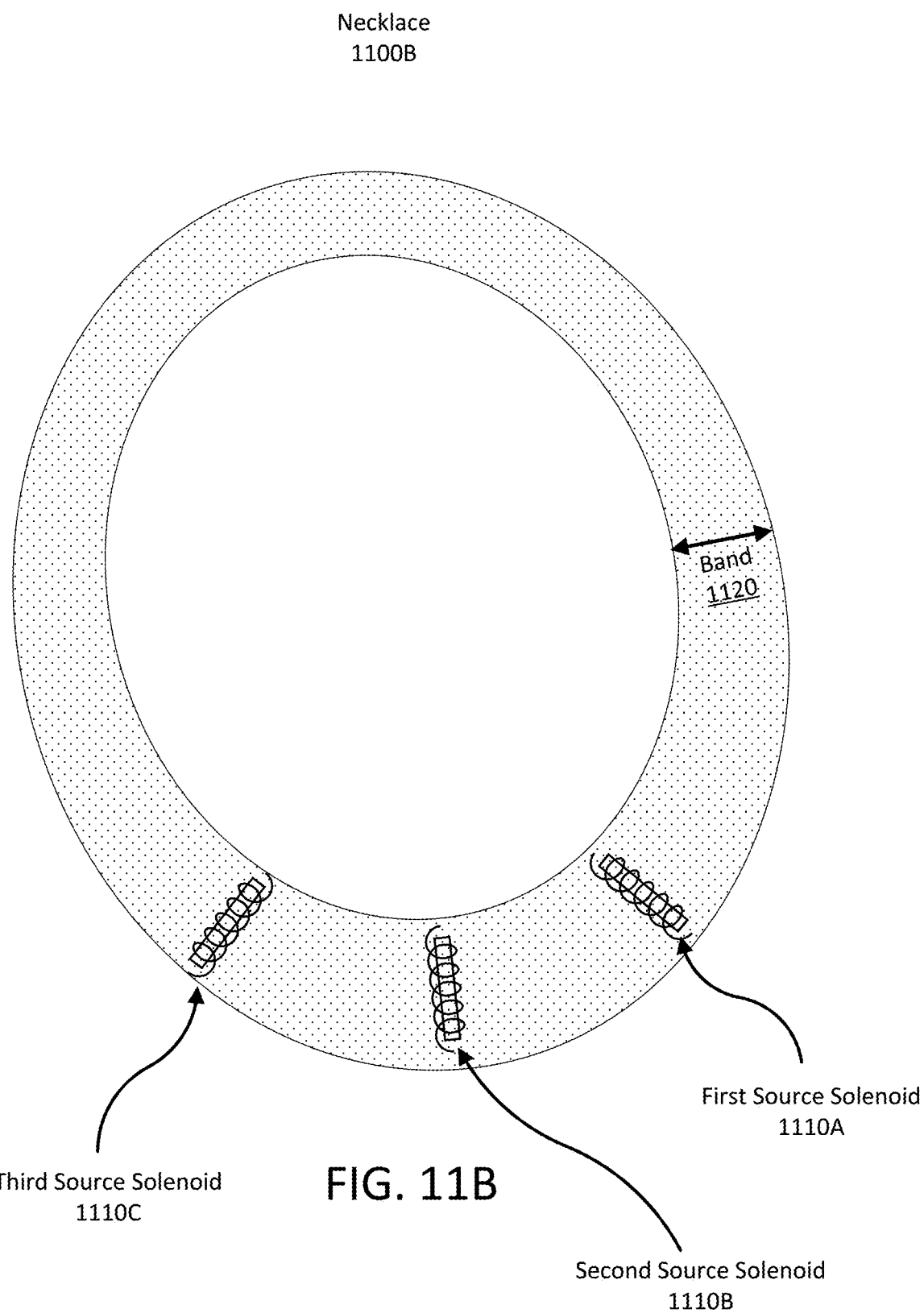

FIGS. 11A-11B illustrate example necklaces including three source solenoids 1110A-C that generate a source TVMF by driving a TVC through the conductive loops of the source solenoids 1110. The source solenoids 1110 are illustrated as versions of the solenoid illustrated in FIG. 4A. As such, each of the illustrated solenoids 1110 includes a low permeability core but could alternatively include a high permeability core. In some circumstances, the solenoids may be coreless solenoids. While the solenoids are visible in FIGS. 11A-B, the source solenoids 1110 may be embedded within the band 1120 and not visible to an observer of the band 1120.

In necklace 1100A of FIG. 11A, the source solenoids 1110 are positioned approximately equidistant from one another about the band 1120 of the necklace 1100A. In necklace 1100B of FIG. 11B, the source solenoids 1110 are all positioned near the front of the band 1120. In the illustrated examples, each source solenoid 1110 is positioned within the band 1120 such that the axis of the solenoid 1110 extends along a line orthogonal to the outer perimeter of the band 1120 towards the center of the necklace 1100.

Figure 11C:
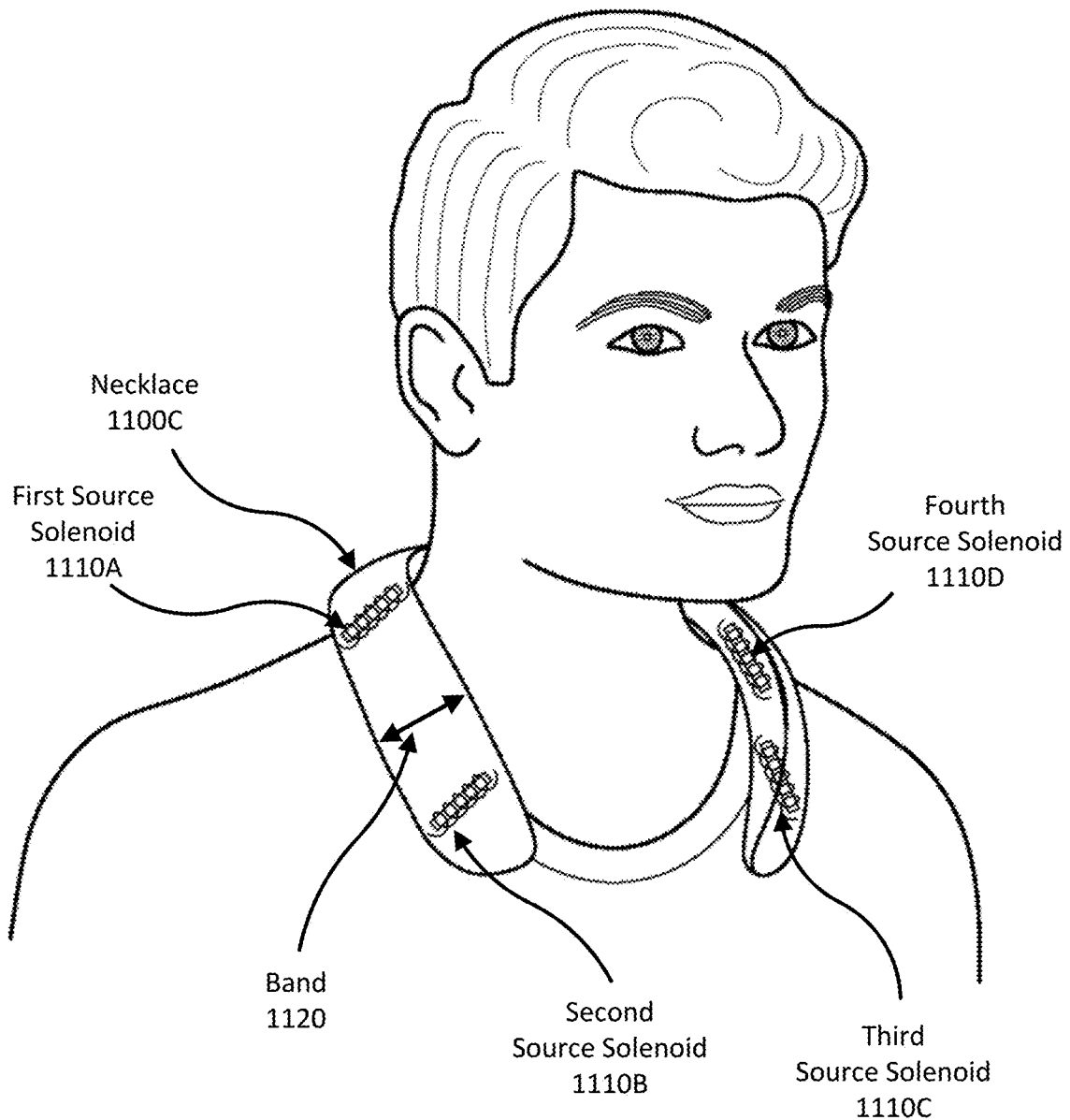
FIG. 11C is an illustration of a necklace for an AR system, where the necklace does not fully encircle the wearer's neck.

FIG. 11C illustrates a user wearing a necklace 1100C (or collar) including four source solenoids 1110A-D rather than three. In various configurations, the solenoids 1110 may include a low permeability core, a high permeability core, or a coreless center. Again, while the solenoids are visible in FIG. 11C, the source solenoids 1110 may be embedded within the band 1120 and not visible to an observer of the band 1120. Because solenoids may be localized at various locations within the band 1120, a necklace including solenoids need not fully encircle a user's neck. For example, as illustrated in FIG. 11C, the necklace forms a "U" shape around the user's neck rather than an "O" shape. Other example shapes that partially encircle a user's neck are possible. Further, the necklace 1100C may include other electronic components distributed about the band 1120 or in a module, as described herein.

The illustrated examples of source solenoids 1110 embedded within a band 1120 of a necklace 1100 are not intended to be limiting. Necklace 110 may include any combination and number of source solenoids 1110 positioned within a band 130 in various configurations. Whatever the number and configuration of solenoids, the solenoids generate a source magnetic field to transmit power and data to receiver solenoids within a contact lens.

ADDITIONAL CONSIDERATIONS

Although the detailed description contains many specifics, these should not be construed as limiting the scope of the invention but merely as illustrating different examples. It should be appreciated that the scope of the disclosure includes other embodiments not discussed in detail above. For example, the technologies described are applicable to eye-mounted displays other than the specific types described above. Examples include displays in contact lenses other than scleral contact lenses, and also intraocular displays. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An electronic contact lens comprising:
   a contact lens body;
   one or more electronic components embedded within the contact lens body;
   at least three solenoids contained within the contact lens body, each solenoid (a) having a length L greater than its effective diameter D, where $D=\sqrt{4A/\pi}$ and A is a cross-sectional area of the solenoid, (b) having an axis that extends along a radial coordinate of the contact lens, and (c) configured to generate power for the electronic components from a time-varying magnetic field;
   wherein no two axes of the solenoids are parallel and no two solenoids are coplanar, and wherein, for each solenoid, the length L is between 0.5 mm and 20 mm, a core of the solenoid comprises a ferrite, and an effective permeability of the solenoid is between 100 and 5000.

2. The electronic contact lens of claim 1, wherein the ferrite core is an iron alloy.

3. The electronic contact lens of claim 1, further comprising:
   a power circuit coupled to the at least three solenoids for using current produced by the solenoids as power for the electronic components.

4. The electronic contact lens of claim 1, further comprising:
   an orientation estimation circuit coupled to the at least three solenoids for determining an orientation of the contact lens based on power generated by the solenoids.

5. The electronic contact lens of claim 1, wherein the contact lens body comprises:
   a front surface, a back surface, and a material between the front surface and the back surface, wherein the at least three solenoids are encapsulated in the material.

6. The electronic contact lens of claim 1, comprising:
   an optical zone in a center of the contact lens through which light incident upon a retina of an eye passes, wherein the at least three solenoids are located outside of the optical zone.

7. The electronic contact lens of claim 1, wherein the contact lens comprises an additional solenoid having an axis that extends primarily along a polar angular coordinate of the contact lens.

8. The electronic contact lens of claim 1, wherein the axes of the at least three solenoids are straight.

9. The electronic contact lens of claim 1, wherein the axes of the at least three solenoids are curved.

10. The electronic contact lens of claim 7, wherein a curvature of the additional solenoid matches a curvature of an edge of the contact lens.

11. The electronic contact lens of claim 9, wherein a curvature of the at least three solenoids matches a curvature of an inner or outer surface of the contact lens.

12. An electronic contact lens comprising:
    a contact lens body;
    one or more electronic components embedded within the contact lens body;
    at least three solenoids contained within the contact lens body, each solenoid (a) having a length l greater than its effective diameter D, where $D=\sqrt{4A/\pi}$ and A is a cross-sectional area of the solenoid, (b) having an axis that extends along a radial coordinate of the contact lens, and (c) configured to generate power for the electronic components from a time-varying magnetic field;
    wherein no two axes of the solenoids are parallel and no two solenoids are coplanar, and
    wherein, for each solenoid, wherein the effective diameter D is between 0.1 mm and 2 mm, a core of the solenoid comprises a ferrite, and an effective permeability of the solenoid is between 100 and 5000.

13. The electronic contact lens of claim 1, wherein the axes of the at least three solenoids lie substantially parallel to exterior surfaces of the contact lens.

14. The electronic contact lens of claim 1, wherein the time-varying magnetic field is produced by a necklace comprising a conductive coil, the necklace configured to drive current through the conductive coil to produce the time-varying magnetic field.

15. The electronic contact lens of claim 14, wherein the necklace only partially encircles a wearer's neck.

16. The electronic contact lens of claim 1, wherein at least one of the solenoids is longer than a thickness of the contact lens body.

17. A contact lens comprising:
    a contact lens body;
    one or more electronic components embedded within the contact lens body;
    at least three solenoids contained within the contact lens body, each solenoid (a) having a length l greater than its effective diameter D, where $D=\sqrt{4A/\pi}$ and A is a cross-sectional area of the solenoid, (b) having an axis that extends along a radial coordinate of the contact lens, (c) configured to generate power for the electronic components from a time-varying magnetic field, and (d) configured to communicate data from/to the electronic components and/or to track an orientation of the contact lens; and
    wherein no two axes of the solenoids are parallel and no two solenoids are coplanar, and
    wherein, for each solenoid, wherein the effective length l is between 0.5 mm and 20 mm, a core of the solenoid comprises a ferrite, and an effective permeability of the solenoid is between 100 and 5000.

* * * * *